United States Patent [19]

Takehara et al.

[11] Patent Number: 4,847,526

[45] Date of Patent: Jul. 11, 1989

[54] VARIANT-POLE ELECTRIC MOTOR

[75] Inventors: Isamu Takehara, Narita; Akira Yamamura, Shibuya; Tsutomu Osawa, Ichikawa; Shigaru Oki, Tokyo, all of Japan

[73] Assignee: Nippon Ferrofluidics Corporation, Tokyo, Japan

[21] Appl. No.: 883,547

[22] Filed: Jul. 9, 1986

[51] Int. Cl.$^4$ .............................................. H02K 1/00
[52] U.S. Cl. .................... 310/185; 310/67 R; 310/154; 310/156; 310/198
[58] Field of Search ............... 310/180, 184, 198, 206, 310/67 R, 43 R, 158, 159, 154, 156, 46, 254, 261, 207, 185, 206

[56] References Cited

U.S. PATENT DOCUMENTS

| | | | |
|---|---|---|---|
| 3,176,206 | 3/1965 | Lund | 310/184 |
| 3,403,272 | 9/1968 | Dold . | |
| 3,790,834 | 2/1974 | Tanaka | 310/156 |
| 3,860,843 | 1/1975 | Kawasaki | 310/67 R |
| 4,097,754 | 6/1978 | Farr | 310/67 R |
| 4,280,072 | 7/1981 | Gotou | 310/67 R |
| 4,315,171 | 9/1982 | Schaeffer . | |
| 4,424,463 | 3/1984 | Musil . | |
| 4,437,029 | 3/1984 | Ban | 310/198 |
| 4,577,139 | 3/1986 | Reinhardt | 310/184 |
| 4,583,016 | 4/1986 | Ban | 310/46 |
| 4,774,428 | 9/1988 | Konecny | 310/67 R |

FOREIGN PATENT DOCUMENTS

| | | |
|---|---|---|
| 2857588 | 10/1980 | Fed. Rep. of Germany . |
| 3202958 | 8/1983 | Fed. Rep. of Germany ...... 310/180 |
| 3246596 | 4/1984 | Fed. Rep. of Germany . |
| 3430396 | 3/1985 | Fed. Rep. of Germany . |
| 3546226 | 7/1986 | Fed. Rep. of Germany . |
| 1556113 | 1/1969 | France . |
| 0034808 | 10/1971 | Japan ............................ 310/67 R |
| 0047908 | 8/1979 | Japan ............................ 310/67 R |
| 2163607 | 2/1986 | United Kingdom . |

OTHER PUBLICATIONS

Digital Logic Handbook; 3–1968; Digital Equipment Corp.; Mayner, Mass.
Patent Abstracts of Japan, vol. 9, No. 197, Aug. 14, 1985, (Sanyo Denki K. K.).

*Primary Examiner*—R. Skudy
*Attorney, Agent, or Firm*—David S. Woronoff

[57] ABSTRACT

A compact, high-torque electric motor in which one motor element (either the stator or rotor) has magnetic poles whose effective magnetic width is substantially equal and which span equal center angles. The second motor element has a plurality of armature groups, each of which occupies a phase sector of the motor element formed by dividing the total periphery by a natural number. All of the armatures within an armature group are connected electrically in series and excited with a current of one phase (either an alternating current phase or an equivalent phase generated by commutator action). Within on pole group the poles may have equal widths or different widths.

8 Claims, 29 Drawing Sheets

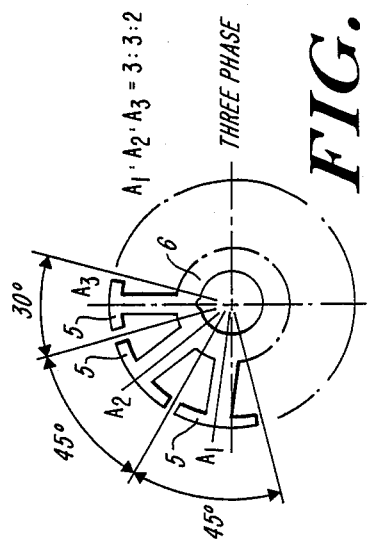
FIG. 49C
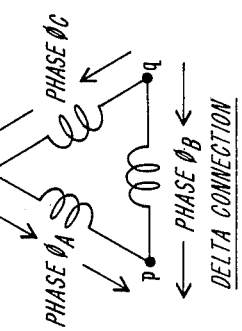
FIG. 49B
FIG. 49A

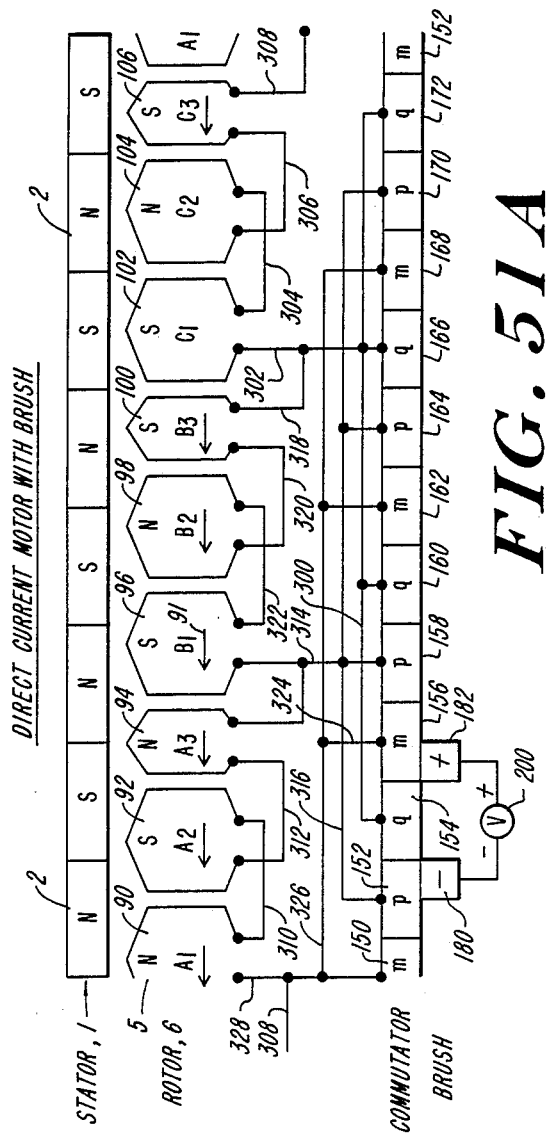
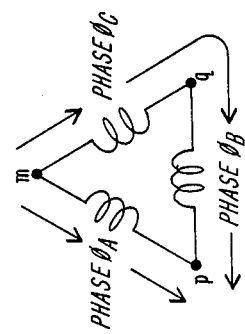
FIG. 51A
FIG. 51B

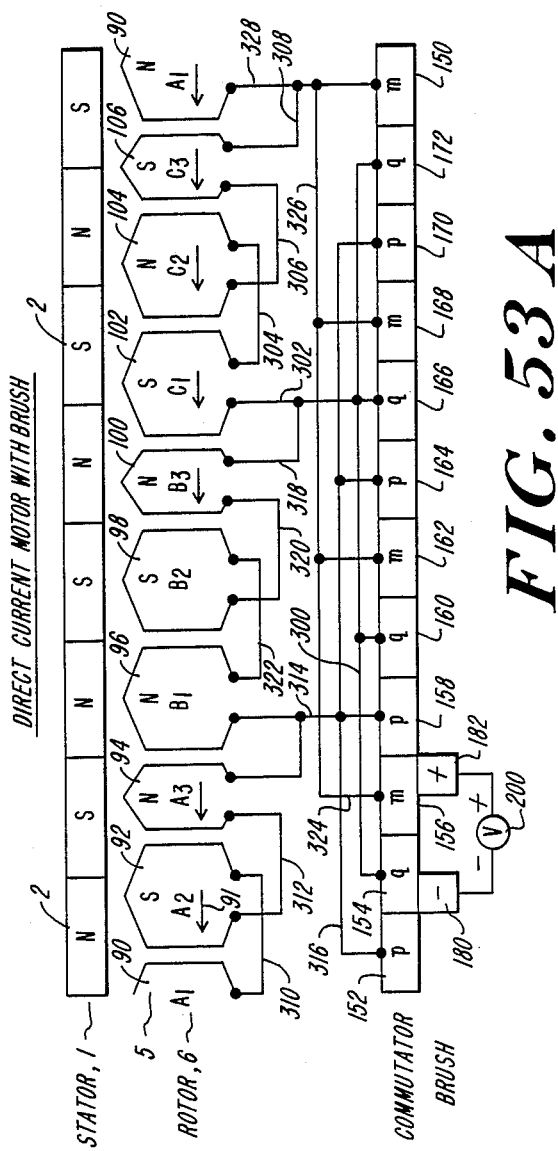
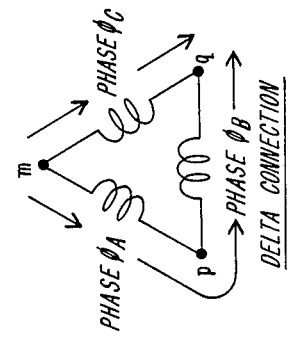
*FIG. 53A*
*FIG. 53B*

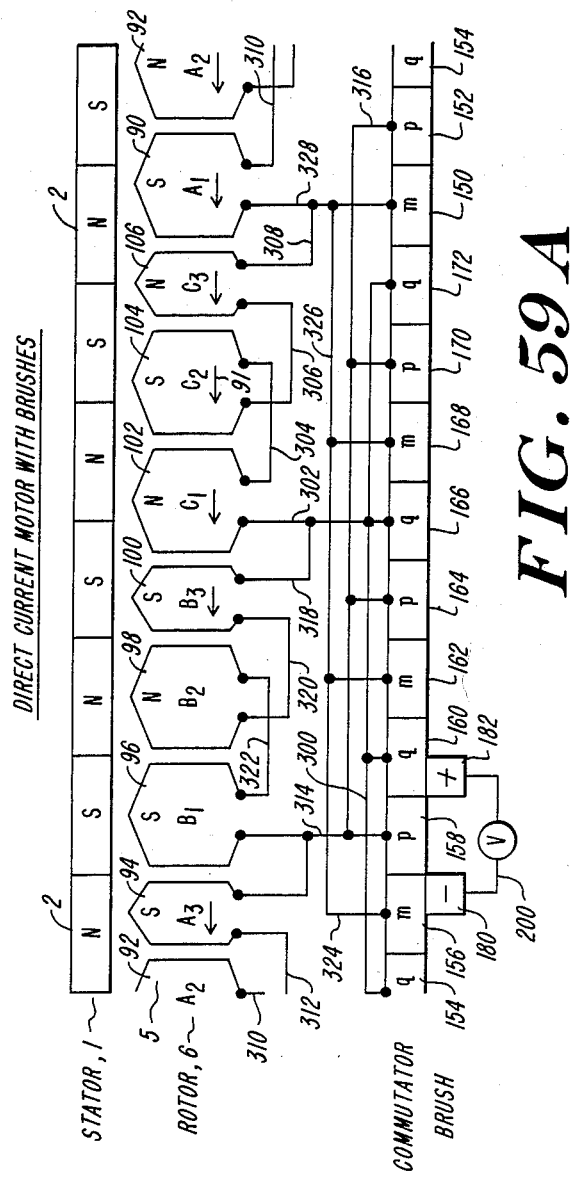

TWO PHASE
$A_1 : A_2 = 2 : 1$

VARIANT-POLE ELECTRIC MOTOR

FIELD OF INVENTION

This invention relates to electric motors and, more particularly, to compact, high-torque electric motors.

BACKGROUND OF THE INVENTION

Conventional electric motors are available in a variety of types depending on their use and the type of electrical current which is used to power them. Motors for use with alternating current include induction motors, synchronous motors, series (universal) motors and repulsion motors. Motors for use with direct current include commutator motors and brushless motors. All of these motors are constructed of three elements—a frame, a stator and a rotor, although the shape and form of these two elements may change. The stator element is generally stationary with respect to the environment and the rotor element generally rotates with respect to the stator. In one well-known type of motor designated a radial gap motor, a cylindrical rotor is attached by bearings to a frame and a stator is disposed around the periphery of the rotor. Alternatively, a cylindrical stator may be attached to the frame and the rotor may be located around the periphery of the stator. Another conventional motor types is an axial-gap motor in which the stator and rotor are disk-shaped.

Both motor elements include magnetic poles which interact to produce the motive forces. Conventionally, a magnetic pole is a electromechanical element which generates a magnetic field of a single polarity. The field which forms the poles may be generated by either permanent magnets or by electromagnets.

As is well-known, in many conventional motors, the magnetic poles are formed by armatures which are electromechanical elements made by winding a coil on a core (or a "core-less" core) made of iron or other materials to produce magnetic pole. The term "armature" in this description is used to describe such elements irrespective of whether the element is part of the rotor or the stator.

The corresponding peripheries of the two motor elements are divided by slots into a plurality of armatures which are energized to form the magnetic poles.

In most known motors, the effective width of the armatures on the rotor is equal—that is the armatures all effectively span the same "center" angle. The center angle is the mechanical or geometrical angle between two radii extending from the axis of rotation along the boundaries of adjacent mechanical elements which form the armatures (if there are air gaps between the elements then the center angle is taken between the radii which extend along the centerlines of the gaps). Similarly, in a conventional motor, the armatures forming the poles of the stator have equal width, although the rotor and stator may have different numbers of poles to prevent lock-up when the motor is starting. "Effective" width means the total width of adjacent elements which have the same magnetic polarity. For example, a plurality of physically adjacent magnetic elements which have the same polarity will be considered as one magnetic pole with a width equal to the the total width of the separate elements.

Magnetic fields are produced on the armatures by windings which are arranged in the slots which define the poles. There are a number of conventional winding techniques which include lap and wave windings. In addition, the windings may be full-pitch or short-pitch windings. As these winding techniques are well-known, they will not be described further in detail. However, in general, known winding techniques use windings wound around the poles in layers. Time varying currents (either alternating currents with various phases or time-varying currents produced by brush commutators or brushless commutation switches) are applied to the windings. The magnetic fields developed by all of the windings at a particular armature add or superimpose to generate a composite or synthesized field at that armature. The timing of the currents is arranged so that the synthesized field rotates with respect to the motor frame and the attraction and repulsion between the rotating field and the rotor magnetic poles provides the motive force.

One problem which arises from conventional winding techniques is that the superposition of the magnetic fields at each armature which produces the rotating field necessarily involves a partial cancellation of portions of the magnetic field developed by each winding layer. Thus, part of the energy which is provided to each winding cancels part of the energy provided to another winding instead of being used to produce a motive force in the rotor. Accordingly, more power must be provided to the motor windings than is theoretically necessary to generate a given power output. In addition, the overlapping winding layers are bulky and make the motor larger than would otherwise be necessary.

More particularly, a conventional radial-gap motor having armatures wound with a full-pitch lap winding and designed to be operated with three-phase alternating current is shown in FIG. 1. In the exemplary motor, the stator 1 is attached to the frame and the rotor 6 is arranged around the periphery of the stator. The rotor is constructed with eight poles 5, which may be formed by permanent magnets or electromagnets. Poles 5 are distributed as alternating north and south poles around the periphery of the rotor. Each of the poles has the same width and spans a center angle of 360°/8=45 degrees.

The stator 1 has 24 slots 3 which define 24 mechanical pole pieces 2a. The motor windings 4 which produce the rotating magnetic field of the stator 1 are placed in slots 3 and wound around the pole pieces 2a to form armatures generally designated as numeral 2. A set of windings is associated with each of the three phases (designated as phases $\phi A$, $\phi B$ and $\phi C$) of the three-phase alternating current and the windings are connected in a well-known "wye" configuration.

In a conventional fashion, the windings are wound around a set of three adjacent mechanical pole pieces, which, when energized, effectively act as a single electromagnetic pole. For example, winding loop 7 is wound around the pole pieces 8a, 9a and 10a to produce three armatures specifically designated by numerals 8, 9 and 10. These armatures, when energized by the three phase alternating current, generate three poles of the same polarity. Thus, the "effective width" of the resulting pole is equal to the width of the center angle 11 spanned by the pole pieces 8a, 9a and 10a. The winding loops progress around the pole pieces in groups of three with alternating groups of three being wound in opposite senses to produce alternating poles of opposite polarity. As shown in FIG. 1, each slot 3 contains wires from two loops and the windings for each of the three phases, φA, φB, φC, are interleaved or layered as shown in FIG. 1. For clarity, FIG. 1 is a simplified schematic view in which each winding is shown as a plurality of single loops with each loop set into two slots and passing around a set of three poles. In a practical construction, each single loop would consist of many turns around each set of poles.

Such a motor is generally constructed in accordance with the well-known relation, $S=MP\tau$, where S is the total number of slots, M is the number of phases of the exciting current, P represents the number of poles and $\tau$ is the winding coil pitch. This relationship gives the number of slots necessary in the stator to achieve the desired winding pitch. In accordance with the above example, $M=3$, $P=8$ and $\tau=1$, giving S, the number of slots, equal to 24.

The interaction of the rotor and stator poles is shown in FIG. 2 which shows equivalent electrical waveforms taken at a given point in time. In FIG. 2, the motor has been "unwrapped" to produce a linear diagram. The top line of the Figure shows the rotor poles 5. As previously mentioned, each pole spans an mechanical angle of 45 degrees (this angle is equivalent to a mechanical angle of $\pi/4$ where $2\pi=360°$).

The next three lines of FIG. 2 show the equivalent electrical "poles" generated at a given instant in time by the currents in each of the three phases (as previously mentioned above, three mechanical poles are grouped to form an effective electrical pole). The mechanical "position" of the poles formed by each phase differs because, at any given time, the currents and voltages in each phase differ in electrical phasing.

The last line of FIG. 2 is a graph at the given instant of time of the magnitude of the the magnetic field produced by currents flowing in each of phases φA, φB and φC (indicated by the solid lines marked φA, φB and φC) versus the mechanical position along the stator periphery. In the last line of FIG. 2, a value above the horizontal axis indicates a magnetic "north" pole and a value below the axis represents a magnetic "south" pole. As is well-known, as the currents in each phase change with time, the synthesized field rotates around the stator axis (in the direction to the right in FIG. 2).

At each pole, the magnetic fields are superimposed to generate a synthesized magnetic field which is shown in FIG. 2 versus stator periphery position as a dotted line. Due to the difference in phasing of the three currents, at many positions along the periphery of the stator, the magnetic fields from two phases substantially cancel to produce the synthesized field. For example, at position 12 along the periphery of the rotor, the fields from phases φA and φC substantially cancel. Thus, electrical energy which must be provided to the system to generate the phase φA field cancels the energy used to generate the phase φC field instead of contributing to the motor output. Such cancellation reduces the motor efficiency.

As shown in FIG. 2, in such a conventional 8-pole, 3-phase alternating current motor, the portions of the windings which are not to some extent cancelled and, thus, can effectively generate output torque are only a small portion of the total windings. Consequently, the energy provided to the windings is not used efficiently to obtain a high output torque.

In addition, the windings are overlapped and wound in three layers. Therefore, the physical thickness of the overlapped layers add bulk and weight to the motor and make it difficult to construct small, thin motors such as are used in computer disk drives.

Such a conventional motor is shown in FIG. 3 which is a schematic elevation of a well-known axial-gap motor. FIG. 4 shows a cross-sectional view of this motor taken along lines 4—4 in FIG. 3. As with the radial-gap motor shown in FIG. 1, the axial-gap motor consists of a rotor 6 and a stator assembly 1. Rotor 6 is attached by hub 17 to a shaft 16 which is supported by bearings 14 and 15 mounted in stator 1. A plurality of magnetic pole pieces 5 are mounted in a radial fashion on the inner face of rotor 6. Pole pieces may illustratively be formed from permanent magnets.

Stator 1 also has a plurality of poles formed by windings 4 which are wound on an open form to produce conventional air-cores. The formed winding coils are attached to the inner face of stator 1.

Also, in a fashion similar to the motor shown in FIG. 1, the stator pole pieces of the axial gap motor of FIGS. 3 and 4 is lap wound with three layers of windings 18, 19 and 20. These windings produce the effective pole configurations and magnetic fields shown in FIG. 2 and the motor operates in a similar fashion to the motor of FIG. 1.

The conventional axial-gap motor shown in FIGS. 3 and 4 suffers from the same defects as the similar radial-gap motor in that the portions of the windings which are not to some extent cancelled and, thus, can effectively generate output torque are only a small portion of the total windings. In addition, the three overlapped layers of windings make it difficult to construct a thin, compact motor with high torque.

In order to reduce the size of the motor an alterntive winding technique known as a "short-pitch" winding is conventionally used. In a typical short-pitch winding arrangement, the windings do not extend as far across adjacent slots as in the full-pitch winding technique and, thus, the overlapping or layering of the windings is reduced to some extent. The short-pitch wound motor has fewer layers of windings in each slot and, thus, the bulk and size of the motor is substantially reduced over the conventional full-pitch motor. However, with the same number of turns in the windings, a motor constructed with a short-pitch winding cannot attain the torque/speed characteristics of a motor contructed with a full-pitch winding. To increase the torque of motors using short pitch windings to match that of motors constructed using full-pitch windings, the number of turns in the armature windings must be increased. In order to do this the slots provided in the stator must be made larger and therefore, motor itself must be made larger so that the advantage gained by reducing the overlapping of the windings is largely nullified.

Accordingly, it is an object of the present invention to provide a compact, high-torque electric motor.

It is another object of the present invention to provide a compact, high-torque motor which does not use a full-pitch winding with overlapping layers.

It is still another object of the present invention to provide a compact, high-torque motor which does not use a full-pitch winding, but develops the torque/speed characteristics of a full-pitch winding.

It is a further object of the present invention to provide a compact, high-torque motor in which the magnetic field produced by the armatures is not internally cancelled and so contributes directly to the output torque.

It is a yet another object of the present invention to provide a compact, high-torque motor construction which can be used with motor construction having a variety of pole numbers and phases.

It is a yet another object of the present invention to provide a compact, high-torque motor construction which can be used with alternating current motors, brush commutator motors and brushless D.C. motors.

SUMMARY OF THE INVENTION

The foregoing problems are solved and the foregoing objects are achieved in one illustrative embodiment of the invention in which one motor element (either the stator or rotor) has magnetic poles of substantially equal effective width which span equal center angles. The second motor element has a plurality of pole groups, each of which occupies a sector of the motor element formed by dividing the total periphery by a natural number. All of the poles within a pole group are connected to the same winding and excited with current of one phase (either an alternating current phase or an equivalent generated by commutator action). Within one pole group the poles may have equal widths or different widths depending on the torque output desired.

More particularly, groups of adjacent poles are excited by one phase of the exciting current. In particular, the total number of poles is divided into a plurality of groups; the number of groups is equal to a multiple of number of phases of the exciting current where the multiplier is a natural number. An even number multiplier is preferred in order to balance thrust forces on the rotor bearings.

Within each group, the armatures are connected electrically in series and are excited by the same phase of alternating current or are excited by connection to the same set of commutator segment bars. However, the direction of winding is reversed between adjacent poles so that the polarity of the poles alternates.

In preferred embodiments, the width of the poles within a group can be varied to maximize the torque output of the motor.

When the armatures are arranged as described, the windings can be constructed of a plurality of loops, each of which is wound around a single pole. However, the resulting motor has the torque/speed characteristics of a motor constructed with full-pitch windings with the same number of winding turns. Since the windings are not overlapped, there is no cancellation of the magnetic field and magnetic flux can be efficiently generated in the armatures.

BRIEF DESCRIPTION OF THE DRAWING

FIG. 5a is a schematic elevation of a radial-gap, three-phase alternating-current eight-pole motor utilizing a wound rotor and permanent magnet stator.

FIGS. 49-60 are schematic charts showing the stator magnet arrangement, the rotor armature windings and the commutator segment relations for various rotor positions of a "three-phase" direct current commutator motor constructed in accordance with the principles of the invention.

DETAILED DESCRIPTION OF THE PREFERRED EMBODIMENTS

Figure 5:
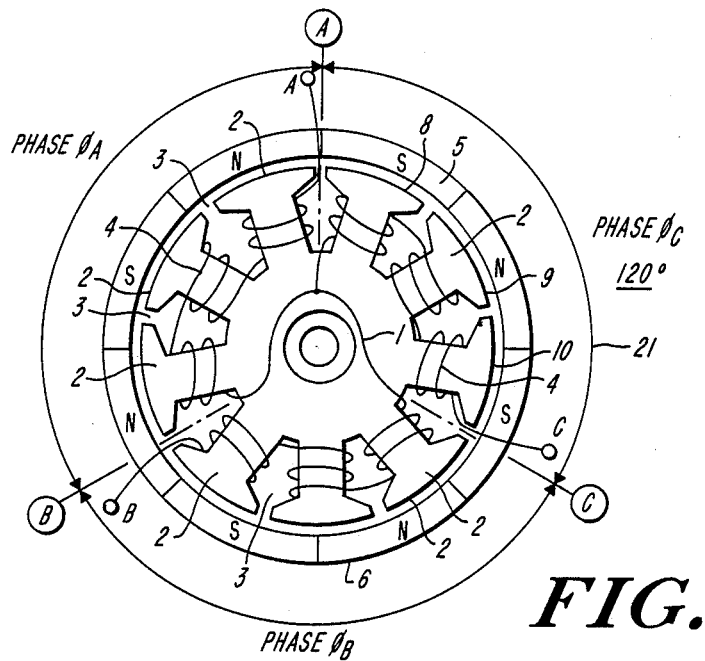
FIG. 5 is a schematic elevation of a radial-gap, three-phase alternating current, eight-pole motor constructed in accordance with the principles of the invention.

FIG. 5 is a schematic elevation of a radial-gap three-phase alternating current electric motor constructed with eight poles and embodying the principles of the present invention.

The motor is comprised of a stator 1 and rotor 6 arranged within a fixed frame (not shown) so that rotor 6 rotates around the outer periphery of stator 1. Magnetic pole pieces 5 having north (N) and south (S) pole orientations are attached to the inner peripheral surface of rotor 6. Each of the pole pieces 5 spans a center angle obtained by dividing the total rotor periphery of 360° by a positive, even number equal to the total number of poles (P). As illustrated in FIG. 5, there are 8 poles (P=8) so that the angle spanned by each pole is 360°/8=45 degrees. The poles are arranged with alternating north and south magnetic polarities. Pole pieces 5 of rotor 6 may be formed of permanent magnets or, alternatively, may be electromagnetic armatures wound with windings carrying direct current.

Stator 1 is formed of armatures 2 wound with windings 4. Although windings are shown in FIG. 5 (and subsequent figures) as consisting of only a few turns, in a practical construction, the windings would consist of many turns—only a few turns are shown to avoid complicating the drawing. The windings for each of the three phases ae illustratively connected in a standard "wye" configuration, but may also be connected in a conventional "delta" configuration. Slots 3 are cut into the outer periphery of stator 1 which slots divide the stator periphery into a plurality of armatures 2.

In accordance with the invention, groups of adjacent armatures are excited by one phase of the exciting current. In particular, the total number or armatures 2 is divided into a plurality of groups or mechanical phases or phase sectors; the total number of groups (Q) is equal to a multiple of number of phases (M) of the exciting current where the multiplier (k) is a natural number. Thus, the number of groups (mechanical phase number) is given by the equation:

$$Q = kM \tag{1}$$

The total number of stator armatures can be determined from the equation:

$$S = P \mp kn \tag{2}$$

where S is the number of stator slots which is equal to the number of stator armatures, and n is a "pole parameter" which is a natural number with $n \neq M$ and $1 \leq n < 2M$ (as discussed below, n may be selected as a design choice to yield different motor configurations).

The negative and the positive relationship in equation (2) result in different motor configurations as will be discussed in detail below. Briefly, a preferred motor design includes a "variant" pole in each pole group whose width differs from the widths of the other poles in a group. If the positive relationship is chosen in equation (2) above, then the variant pole has a width that is narrower than the remaining poles in its pole group. Conversely, if the negative relationship in equation (2) is chosen, then the width of the variant pole is wider than the remaining poles. However, it has been found that motors designed with equation (2) using the positive relationship have superior performance and, accordingly, the positive relationship is preferred.

The number, N, of stator armatures per mechanical phase is given by the equation:

$$N = P/Q \mp n/M \tag{3}$$

where the positive or negative relationship is selected depending on whether the negative or positive relationship was selected in equation (2).

In the illustrative example, there are three phases ($\phi A$, $\phi B$ and $\phi C$) of the exciting current and a multiplier, k, of "1" is selected so that the number of groups, Q=3. The number n is selected to be "1" and the positive relationship in equation (1) is selected giving the total number of armatures equal to nine. The total of nine armatures is divided into three groups or mechanical phases of three armatures. Each group of three armatures is located in a sector which spans a center angle of 360°/Q=360°/3=120 degrees. Within each sector equation (3) gives a group of three armatures (N=3). One such group would consist of armatures 8, 9 and 10 which span a center angle 21 of 120°.

Within each group, the armatures are excited by the same phase of the alternating current—for example, armatures 8, 9 and 10 are excited by current phase $\phi C$. More particularly, the windings 4 wound around armatures 8, 9 and 10 are connected electrically in series. However, the direction of winding is reversed between adjacent armatures so that the polarity of the poles alternates. Each of the three sectors is wound in the same manner.

Although in the illustrative embodiment, the rotor is shown with permanent magnet poles and the stator is shown with wound armatures, in accordance with the principles of the invention, the stator could have permanent magnet poles and the rotor could have wound armatures and the result would be equivalent. An illustrative motor in which the stator has permanent magnet poles and the rotor has wound armatures is shown in FIG. 5a. In FIG. 5a, stator 1 has eight permanent magnet poles and rotor 6 has nine slots which form nine armatures. The operation of the motor shown in FIG. 5a is analogous to that shown in FIG. 5.

Figure 6:
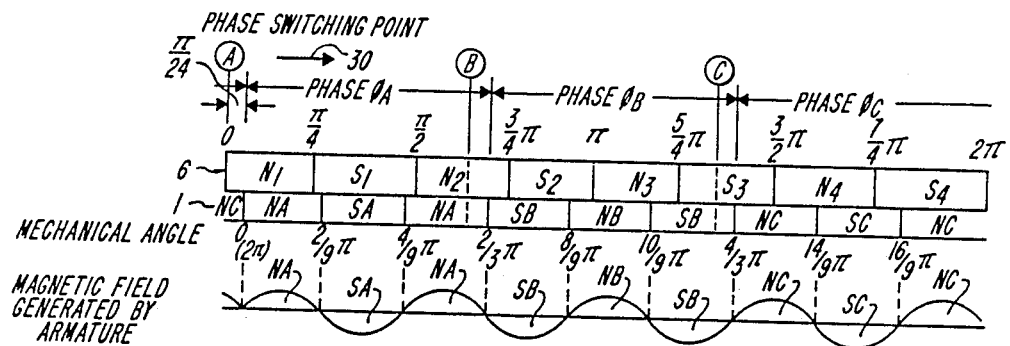
FIGS. 6–11 are schematic charts showing the mechanical locations of the effective poles on the rotor and stator and the magnetic fields produced by the windings at selected instants of time in the motor of FIG. 5.

FIGS 6-11 show schematically, in a linear fashion, the fields produced by the stator armatures 2 (shown in FIG. 5) and their interaction with the rotor fields to cause rotation of the rotor 6. In FIG. 6, the upper line represents the magnetic poles 5 on rotor 6. The periphery of rotor 6 is equally divided into 8 segments corresponding to arcs spanning the eight center angles of $\pi/4$ which comprise the entire rotor periphery. The magnetic poles (labeled N and S) are arranged to be alternating in polarity and are labeled N1, S1-N4, S4 for reference.

The second line represents the magnetic poles developed by the windings 4 on stator armatures 2 (shown in FIG. 5). As previously mentioned, the armatures are divided into three groups which together span a center angle of $2\pi/3$ and each group is excited by an electric current of a single phase. Within each group the armatures are of equal width ($2\pi/9$) and are wound to form alternating north and south poles which are labeled NA, SA to NC, SC corresponding to the exciting current phase, $\phi A$ to $O\phi$.

FIGS. 6-11 also show three "phase switching points" marked A, B and C. As will hereinafter be described in detail, the motor configuration shown in FIG. 5 can also be used to construct a brushless D.C. motor. In this latter case, points A, B and C mark the locations of sensors which sense the angular position of rotor 6 and control the switching of D.C. currents applied to the stator windings. Phase switching points are similarly noted in figures associated with other motor designs (FIGS. 14-19, 21-26, 31-36 and 38-43).

In the motor of FIG. 5 it has been found that the best performance is obtained when the phase switching points are offset from the stator pole boundaries by an angle of 7.5° ($\pi/24$) as shown in FIGS. 6-11. In other motor designs the phase switching points may be located on the boundary between stator or rotor poles as shown in the respective figures.

Referring to the motor configuration shown in FIG. 5 operating as an alternating current motor, when the stator armatures are excited by the three-phase alternating current, a magnetic field which is described by the waveforms shown in the lower part of FIG. 6 is produced at a particular point in time. In this case, magnetic pole S2 on rotor 6 will be repulsed by magnetic pole SB of stator 1 and will be attracted by pole NB. Similarly, magnetic pole N3 will be repulsed by pole NB and attracted by pole SB. The same result occurs for poles S3, N4 and S4. On the other hand pole N1 is repulsed by both poles NC and NA and, consequently, rotor pole N1 actually generates a small torque in the reverse direction. This reverse torque is cancelled by a small positive torque produced by rotor pole N2 which is repulsed by stator pole NA and attracted by stator pole SB. Pole S1 is substantially aligned with stator pole SA and, thus, produces an entirely radial force. Consequently, rotor poles N1, S1 and N2 do not contribute to the output torque and are deemed to be in a "neutral zone."

The maximum torque is produced from the poles of the rotor and stator which are offset by an angle of nearly $\pi/8$, as is the case with pole S3. A smaller contribution is produced by rotor and stator poles which are more nearly aligned such as poles N3 and N4. Even less contribution results from poles such as poles S2 and S4 which are substantially aligned with their respective stator poles. With these latter poles the repulsive and attractive forces between the rotor and stator poles mainly produce a radial force which results in a unwanted force on the rotor bearings rather than a rotational torque. Nevertheless, the majority of magnetic poles produce at least a small contribution to the overall torque which tends to rotate the rotor 6 rightward in the direction of arrow 30.

Figure 7:
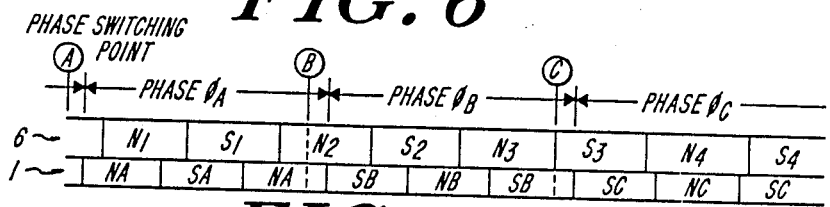
Figure 8:
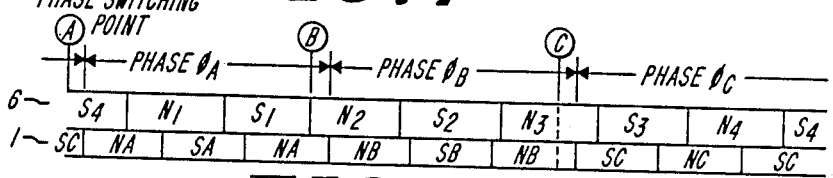

FIG. 7 is a diagram of the illustrative motor at an instant of time slightly later than the instant of time shown in FIG. 6 in which the rotor 6 has rotated an angle of 15° ($\pi/12$) to the right. During this period of time the exciting currents have advanced an electrical angle equal to 60°. The magnetic field produced by the stator armatures is the same as shown in FIG. 6 with the exception that the magnetic field generated by the current $\phi C$ has reversed in direction causing a reversal in the orientation of poles NC and SC. This reversal produces a field discontinuity point near phase switching point C. Again, the maximum torque is produced from the poles of the rotor and stator which are offset by an angle of nearly $\pi/8$, as is the case with pole N2. A smaller contribution is produced by rotor and stator poles which are more nearly aligned such as poles S1 and S2 and even less contribution results from poles such as poles N1 and N3. Poles S3, N4 and S4 lie in a "neutral zone" and, thus, do not contribute to the output torque.

Figure 9:
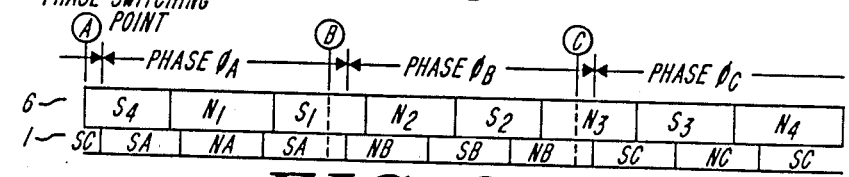
Figure 10:
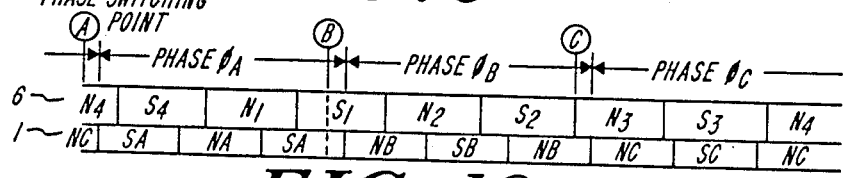
Figure 11:
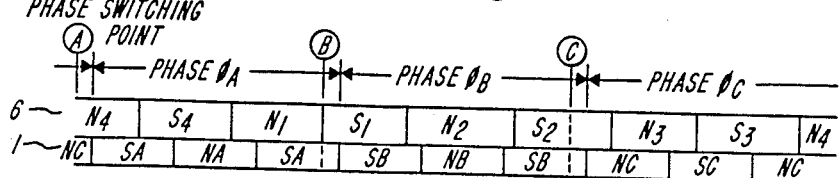

FIGS. 8-11 show the change in the poles of rotor and stator armatures at points in time at which rotor 6 advances rightward by a successive angles of 15 degrees and the phase of the magnetic field generated in each stator armature 2 advances by an electrical angle of 60 degrees. In particular, in FIG. 8, the direction of the magnetic field generated in the stator sector excited by current phase $\phi B$ will become reverse to that shown in FIG. 7. In FIG. 9, the direction of the magnetic field generated in the stator sector excited by current phase $\phi A$ will become reverse to that shown in FIG. 8. Consequently, the polarities of the stator armatures will progressively vary but, at any given point in time, the repulsive and attractive forces developed between the rotor poles and stator armatures will be the same as is described in FIGS. 6 and 7 and in all the positions a torque rotating the rotor rightward will be produced.

From FIGS. 6-11 can be seen that maximum torque is produced when the poles of the stator and rotor are offset by an angle substantially equal to $\frac{1}{2}$ of the center angle spanned by the rotor poles because in this position, each rotor pole is both repulsed and attracted to a maximum extent by the surroundng stator poles. Consequently, in order to produce maximum torque, it would be necessary to utilize a stator with same number of armatures as the number of rotor poles so that each of the stator armatures spans the same center angle as each of the rotor poles.

Figure 12A:
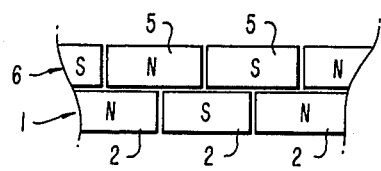
FIGS. 12(A)–12(C) show a partial schematic view of the stator and rotor poles of equal width illustrating potential starting problems.

Such a design is schematically shown in FIG. 12(A) which shows a linear representation of a rotor 6 and a stator 1 with poles (5 and 26, respectively) of equal width. Consequently, at the rotor position shown, the torque output of the motor is highest for the poles are offset by a distance factor equal to $\frac{1}{2}$ the pole width. In this case, each of the rotor poles is not only repelled to a large extent by a stator pole but is also attracted by the same extent by the succeeding stator pole.

Figure 12B:
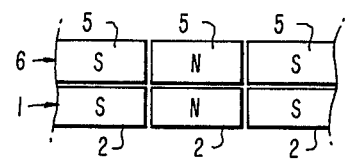
Figure 12C:
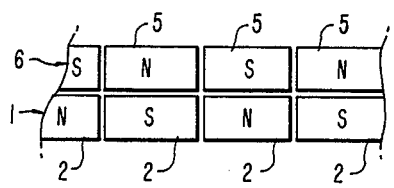

The problem with such a system is that when rotor 6 and stator 1 are either offset by an electrical angle of 0 (as shown in FIG. 12(B) or an electrical angle of $\pi$ as shown in FIG. 12(C) there is no torque generated because all of the rotor and stator poles lie in "neutral"

zones. For example in FIG. 12(B) the rotor poles and stator poles are strongly repelled, but the entire repulsion force is a unwanted force generated in a radial rather than in a tangential direction. Similarly, as shown in FIG. 12(C) a strong attractive force is developed between the rotor and stator poles, but again the force is entirely radial. Thus, with such a motor, there are at least two rotor positions in which thre is no torque generated.

Cnsequently, a motor of this construction is impractical because it is possible that, upon starting, the motor will be in one of these two positions so that it will lock up. In contrast, a motor constructed in accordance with equations (1) and (2) will always have rotor and stator poles of unequal width and, thus, it cannot lock up on starting because, as shown in FIGS 6–11, there is always a positive output torque generated at each position of the rotor which tends to initiate and maintain rotation.

However, since there are an unequal number of rotor poles and stator poles the optimal offset relationship (one half the pole width) cannot be met at each pole. In fact, with the stator pole arrangement shown in FIG. 5, the offset relationship can be substantially met at only one pole with the other poles being offset at various degrees and, thus producing less than the optimum contribution to the overall torque.

In accordance with the invention, the output torque can be increased by making the stator poles in each phase sector of different width so that some of the poles are substantially the same width as the rotor poles, while other stator poles have different widths from the rotor poles to insure that there is positive torque at each rotor position.

Figure 13:
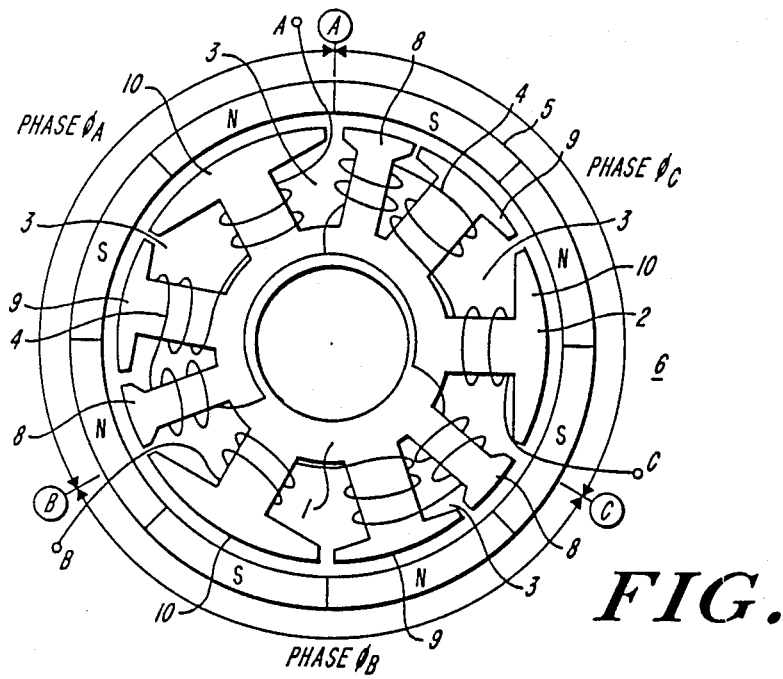
FIG. 13 is a schematic elevation of an alternative embodiment of a three-phase alternating-current, eight-pole radial-gap motor constructed in accordance with the principles of the invention.

FIG. 13 shows a schematic elevation of another embodiment of a three-phase, eight-pole, radial-gap, brushless direct-current motor constructed in accordance with the present invention. In FIG. 13, as with the previous designs, rotor 6 is positioned on the outer periphery of stator 1. The pole number, P, has been chosen to be eight. Thus, the central angle occupied by each of the magnetic poles 5 in rotor 6 is an angle of $\pi/4$ obtained by dividing the angle of $2\pi$ in the entire periphery by eight. The north-south orientation of the magnetic poles 5 alternates along the inner surface of rotor 6 in a manner similar to the motor shown in FIG. 13. The multiplier, k, has been chosen to the "1" giving the mechanical phase number, Q=3 from equation (1). from equation (2) the total stator armature number is nine. From equation (3) the total number of armatures per mechanical phase is three (N=3).

Within each mechanical phase, the relative widths of the stator armatures can be varied to produce different motor configurations. For example, the widths of the armatures can be expressed as ratios of the widths of the "wide" armatures to the "narrow" armatures. Assuming that the widths of the armatures are represented by the expression Ax, Bx and Cx, respectively, then the total width of the armatures must meet the expression, $Ax + Bx + Cx = 360°/Q$ or, in general:

$$\sum_{i=1}^{N} A_i x = 360°/Q \quad (4)$$

where $A_i$ represent the ratios of the armature widths.

From equation (4)

$$x = 360°/Q \left( \sum_{i=1}^{N} A_i \right) \quad (5)$$

Illustratively, in the motor of FIG. 13 the ratio of $A_1:A_2:A_3$ is chosen as 1:2:3 ($A_1=1$, $A_2=2$ and $A_3=3$) giving x=20° from equation (5). Accordingly, from equation (4) the narrowest armature, 8, spans a central angle of $A_1x=(1)(20°)=20°$ ($\pi/9$). The next widest armature, 9, spans a central angle of $A_2x=(2)(20°)=40°$ ($2\pi/9$). The widest armature, 10, spans a central angle of $A_3x=(3)(20°)=60°$ ($\pi/3$).

The electric currents for three phases $\phi A$, $\phi B$ and $\phi C$ are passed to each armature, at point spaced around the periphery by central angles of $2\pi/3$. Accordingly, only a current for a certain phase is passed to a group of armatures in a manner similar to the first illustrative example. Not shown in FIG. 13 are the current switching devices which control the flow of current in the armature windings. The current switching devices sense the position of the rotor with respect to the stator and allow current to flow or cut it off in certain of the stator windings. Such devices may be Hall-effect devices, opto-electric devices or mechanical devices. The construction and operation of these devices is conventional and well-known and, therefore, will not be discussed further in detail. The devices may be located at the points labeled A, B and C in FIG. 13 and connected into the current driving circuit for the stator windings.

Figure 14:
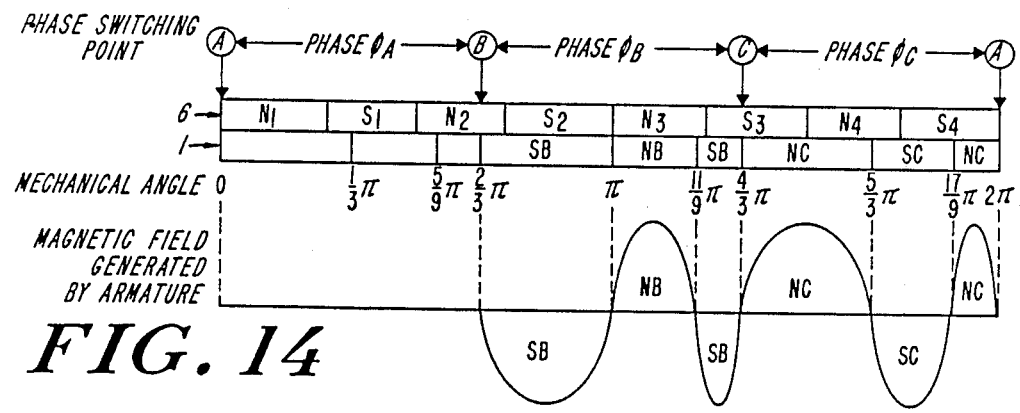
FIGS. 14–19 are schematic charts showing the mechanical locations of the effective poles on the rotor and stator and the magnetic fields produced by the windings at selected instants of time in the motor of FIG. 13.

The operating principles of the motor are shown in linear form in FIGS. 14–19. The relative layout of FIG. 14 is similar to the layout of FIG. 6. The first line of FIG. 14 shows the magnetic poles 5 of rotor 6 and the second line shows the magnetic poles generated by the armatures 2 of stator 1. The lowest line shows the three-phase alternating magnetic field generated in the armatures 2 of stator 1. Within each armature group the magnetic field of the respective armatures (for example, 8, 9, 10) is reversed due to a reverse in the direction of winding between the respective armatures.

At the point in time shown in FIG. 14, due to the action of the current control devices no current flows in the armatures associated with mechanical phase $\phi A$. If the magnetic poles 5 of rotor 6 are designated as N1, S1–N4, S4 and the magnetic poles of the stator are designated as poles NA, SA–NC, SC, then rotor magnetic pole N2 is attracted by stator magnetic pole SB. Rotor pole N3 is repulsed by the stator pole NB and is attracted by the stator magnetic pole SB. Similarly rotor pole S3 is repulsed by stator pole SB and attracted by stator pole NC. A similar result holds true for rotor poles N4 and S4 and their respective stator poles. Rotor pole S2 is aligned with stator pole SB and thus is a "neutral zone" in that it produces only a radial force.

Thus, most of the magnetic poles 5 in rotor 6 will generate a torque output to rotate rotor 6 in a rightward direction. As with the previous embodiment, the contribution of each pole to the overall torque depends on the relative offset of the rotor and stator poles. Although the present embodiment does not maximize torque, the total relative offset is greater than the previous embodiment and thus the torque generated is higher.

FIGS 15–19 show instants of time at which rotor 6 has advanced rightward by the mechanical angles of 90/12, and the "phase" of the exciting current created by the current switching devices flowing in the stator armatures advances by the electrical angle of $\pi/3$.

Figure 15:
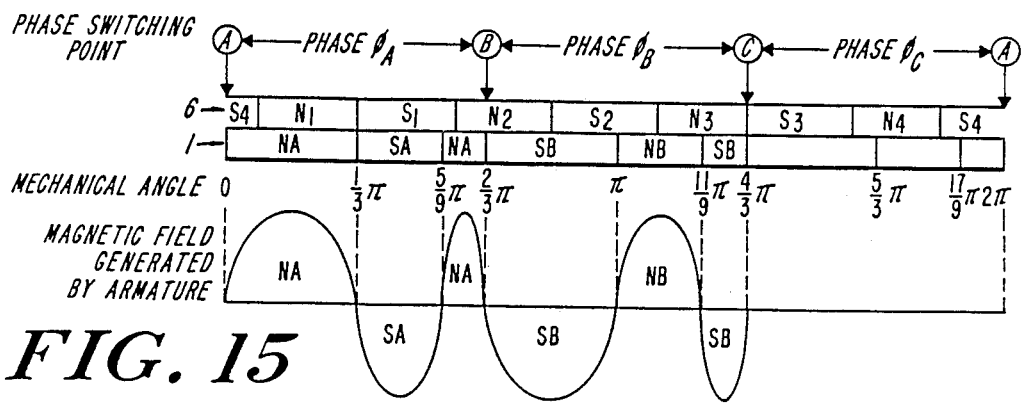
Figure 16:
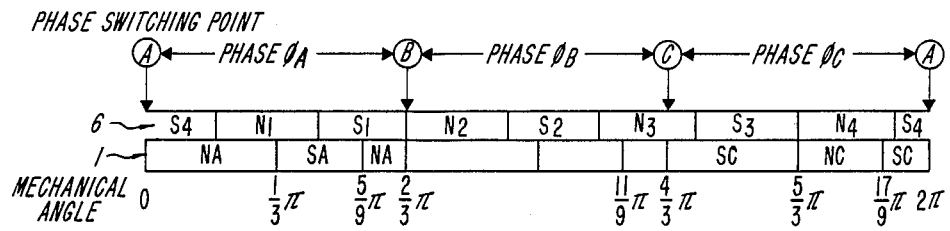
Figure 17:
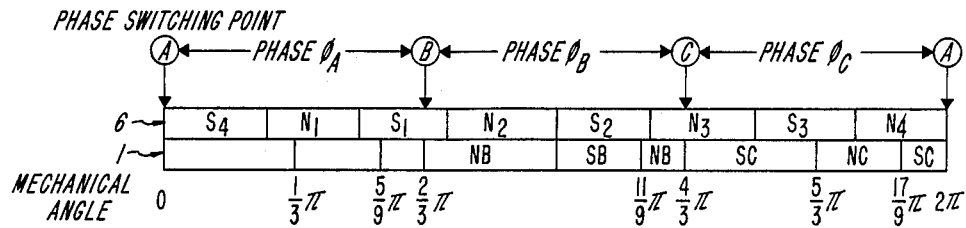
Figure 18:
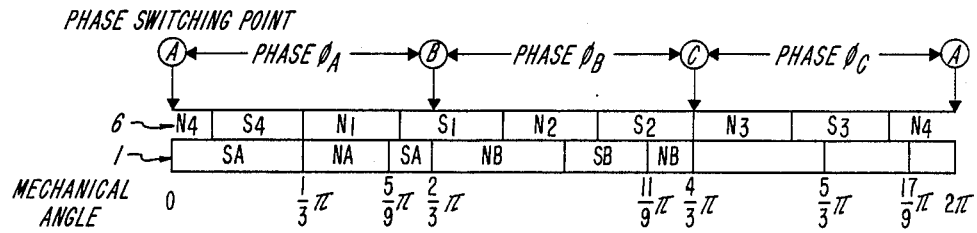
Figure 19:
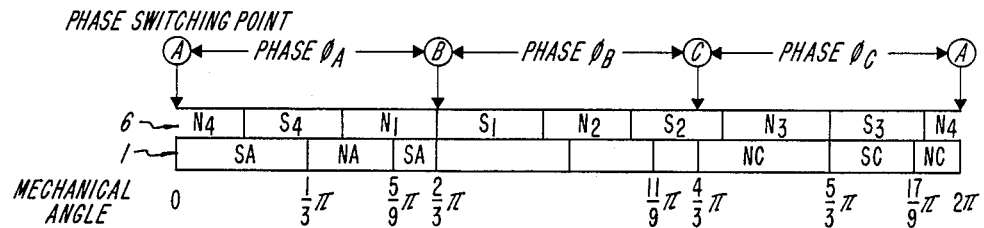

In FIG. 15 is exciting current were passed to the stator armatures in mechanical phase $\phi C$, a reverse torque would be generated by the interaction of the rotor and stator poles. To prevent a reverse torque from being generated, the exciting current for the phase $\phi C$ is cut by the current switches at the instant of time shown in FIG. 15. Similarly, the current for the phase $\phi B$ in FIG. 16, the current for phase $\phi A$ in FIG. 17, the current for phase $\phi C$ in FIG. 18 and the current for phase $\phi B$ in FIG. 19 are cut to prevent the generation of reverse torque.

A motor constructed in accordance with the principles of the present invention always generates a high output torque with good efficiency because, in any position, some of the rotor and stator poles are offset due to the fact that some of the stator poles have a width substantially equal to the rotor poles and other poles that are narrower than the rotor poles. Thus, on starting an unbalanced torque is always generated to prevent lock-up. Since the windings on the stator armatures are not overlapped, as in a conventional lap wound motor, the magnetic flux generated by the armatures at any time is not cancelled and thus all armatures are effectively excited.

Figure 20:
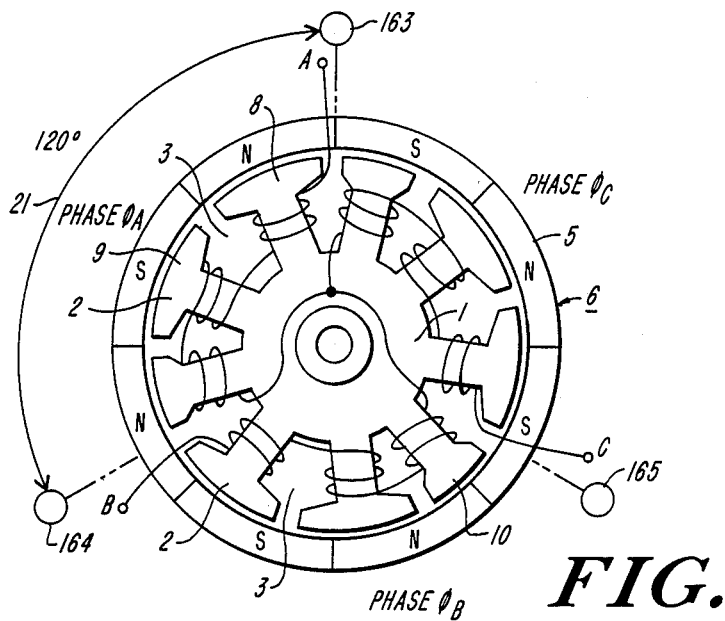
FIG. 20 is a schematic elevation of an alternative embodiment of a three-phase alternating current, eight-pole radial-gap motor constructed in accordance with the principles of the invention.

In accordance with the invention, a preferred motor which produces highest torque of the inventive designs and which is not subject to lock-up on starting is shown in FIG. 20. The motor shown in FIG. 20 is similar to that shown in FIG. 13 with the exception that the ratio of armature widths of the "wide" armatures has been changed. FIG. 20 shows a schematic elevation of a radial-gap three-phase alternating current electric motor constructed with eight poles and embodying the principles of the present invention. The basic motor construction is similar to the construction of the motor shown in FIG. 13 with the exception that the width of the stator armatures in each armature group is different.

In particular, the rotor periphery is divided into eight poles (P=8), each of which spans a center angle of 45° ($\pi/4$). As with the previous motor design, the total number of stator armatures is selected according to equation (2) with n=1 (as previously mentioned, the positive relationship in equation (2) is preferred because it produces superior performance) giving a total of nine stator armatures which are divided into three groups with each group being excited by current of a single phase. However, in contrast to the motor of FIG. 13, in each sector, two of the three armatures have a width equal to the rotor pole width, but the third stator armature (the "variant" pole) is narrower. Specifically, in FIG. 20, in sector 21, two armatures, 8 and 9, span the same center angle (45°) as the rotor poles, but the center angle spanned by the remaining armature, 10, is less than the center angle spanned by the other armatures in the group (if the negative relationshp in equation (2) is chosen, then the variant pole will have a width which is wider than the other armatures in the group). In a similar fashion, a "variant" armature 10 is included in each armature group and the variant armatures are uniformly arranged around the periphery of the stator. In this arrangement, the maximum torque is generated by the interaction of the stator poles with the rotor poles of the same width while the variant pole produces an imbalance which prevents lock-up on starting.

In accordance with the invention for optimal performance, the center angle, $C_n$, spanned by the single variant armature 10 in each of the phases $\phi A$, $\phi B$ and $\phi C$ is determined by the following formula:

$$C_n = (360°/P)(1 \pm n/M) \qquad (6)$$

where n is the number selected above with in connection with the number of stator poles. The center angle spanned by the $N-1$ other armatures in each group is, in general, determined by the following equation:

$$C_w = 360°/P \qquad (7)$$

Therefore, in the illustrative example where P=8, S=9, n=1, N=3, giving $C_w = 45°$ from equation (7) and $C_n = 30°$ from equation (6). The same result can be achieved from equations (4) and (5) using the ratio of $A_1:A_2:A_3 = 2:3:3$.

FIGS. 21–26 are linear diagrams showing the operating principle of the illustrative three phase, eight pole motor. More particularly, in FIG. 21, the upper line consists of the rotor poles 5. The next line consists of the stator poles formed by armatures 2. The lowest line is a diagrammatic representation on the field developed by the stator windings.

On rotor 6, the magnetic poles 5 having orientations N and S are equally divided into eight parts (P=8) spanning center angles of $\pi/4$ to span the entire periphery. The exciting current of the three phases $\phi A$, $\phi B$ and $\phi C$ is provided at intervals of $2\pi/3$ to the three armature groups. Each armature group is comprised of two armatures spanning a center angle of $\pi/4$ degrees and one "variant" armature spanning an angle of $\pi/6$ degrees.

Figure 21:
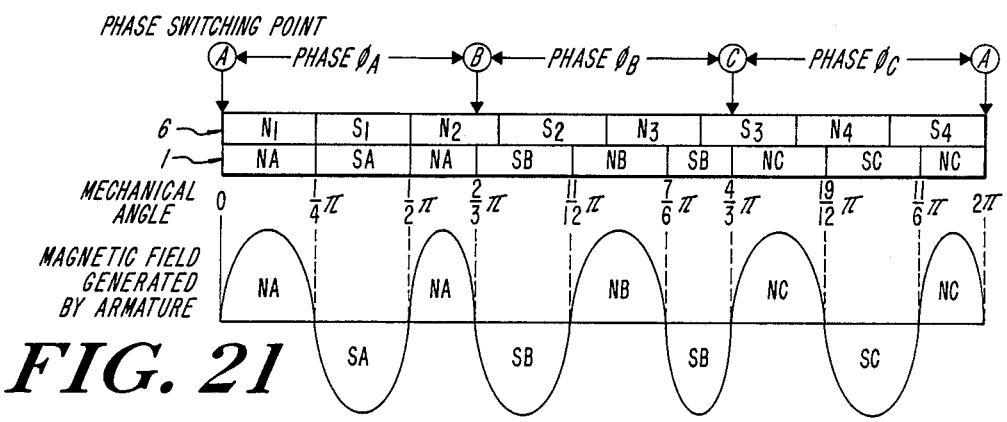
FIGS. 21–26 are schematic charts showing the mechanical locations of the effective poles on the rotor and stator and the magnetic fields produced by the windings at several instants of time in the motor of FIG. 20.
Figure 22:
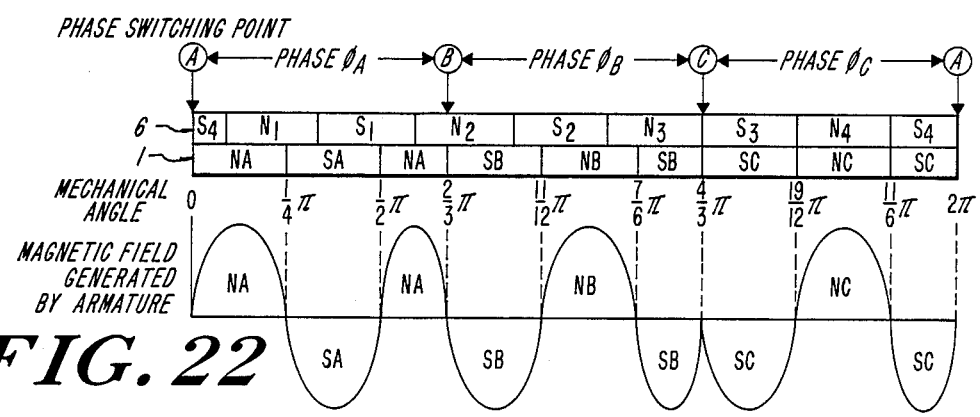
Figure 23:
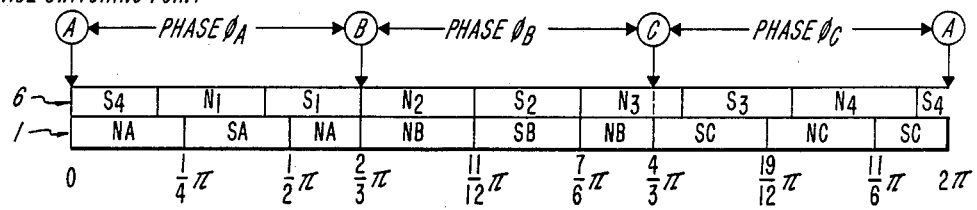
Figure 24:
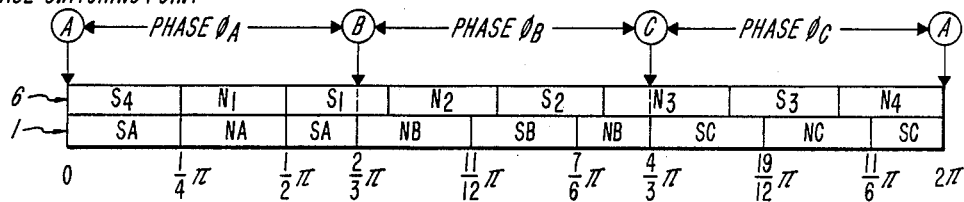
Figure 25:
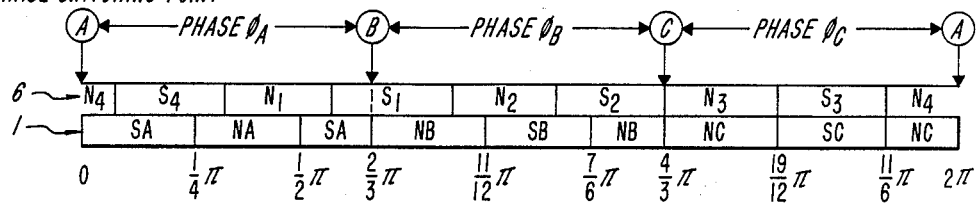
Figure 26:
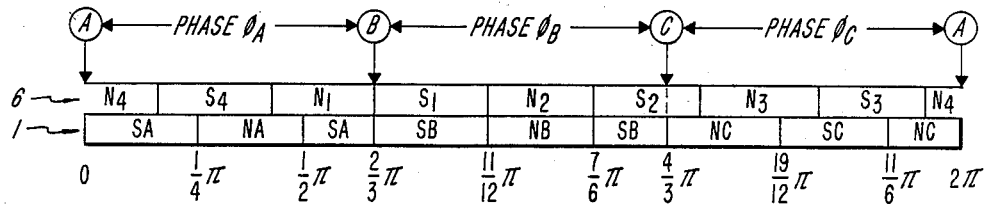

Assuming at one instant of time that current flows into point A in FIG. 21, divides equally and flows out from points B and C, a three-phase alternating magnetic field will be generated in the stator 1 as shown in the third line of FIG. 22. Progressing around the periphery of the stator, the magnetic field is reversed in each succeeding armature because the winding direction is reversed between armatures.

Rotor pole N2 will be repulsed by stator pole NA and attracted by stator pole SB. Similarly, rotor pole S2 will be repulsed by stator pole SB and attracted by stator pole NB. In the same manner rotor poles N3, S3, N4 and S4 will be repulsed and attracted by their respective surrounding stator poles and, thus, a torque force will be produced by each rotor pole causing the rotor to rotate rightward. Rotor poles N1 and S1 are "neutral" in that they produce only a radial force which produces a unwanted force on the rotor bearings but does not contribute to the torque force.

However, in accordance with the invention, even though rotor poles N1 and S1 are neutral and do not contribute to the output torque, in the overall sense, the offsets between the rotor and stator poles for the remaining poles N2, S2–N4, S4 are larger for the motor of FIG. 20 than for the motors shown in FIGS. 5 and 13 and thus the torque produced is higher for the same number of windings. Furthermore, poles N1 and S1 are only neutral in the precise position shown, for if rotor 6 rotates rightward even a little, rotor pole N1 will be repulsed by stator pole NA and attracted by stator pole SA and rotor pole S1 will be repulsed by stator pole SA and attracted by stator pole NA so that a torque rotating the rotor 6 rightward will be produced over all the poles.

When the rotor 6 advances rightward by a mechanical angle of 15 degrees ($\pi/12$), the relation between the rotor poles 5 and stator poles 2 will be as shown in FIG. 22. At this time, the phase of the magnetic field generated by each of the electrical currents with phases $\phi A$, $\phi B$ and $\phi C$ will advance by an electrical angle of 60 degrees and, as shown in FIG. 22, the direction of the magnetic field caused by the phase $\phi C$ current will change and therefore the polarity of magnetic field at stator poles NC and SC will become reverse to that shown in FIG. 21.

In this case, rotor pole N1 will be repulsed by stator pole NA and attracted by stator pole SA; rotor pole S1 will be also repulsed by stator pole SA and attracted by stator pole NA. Similarly, rotor poles N2, S2, N3 and S4 will be attracted and repelled by the nearby stator poles and, thus, a torque rotating the rotor rightward will be produced. However, now rotor poles S3 and N4 have become neutral zones and no longer contribute to the output torque. Nevertheless, as before, in the overall sense, the offsets between the rotor and stator poles for the remaining poles are larger for the motor of FIG. 20 than for the motors shown in FIGS 5 and 13 and thus the torque produced is higher.

FIGS. 23–26 show the polarities of the rotor 6 poles and stator poles at succeeding time points at which rotor 6 advances rightward by a mechanical angles of 15 degrees ($\pi/12$) and the phase of the magnetic field generated in each armature 2 advances by an electrical angle of 60 degrees.

Figure 1:
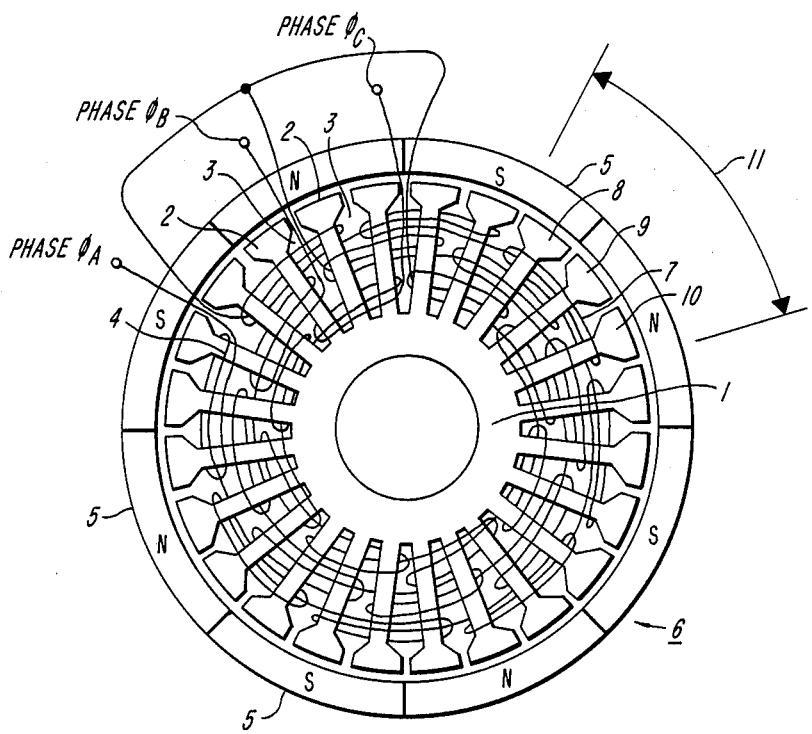
FIG. 1 is a schematic elevation of a conventional, prior art radial-gap, three-phase alternating-current motor constructed with eight poles using full-pitch lap windings.
Figure 3:
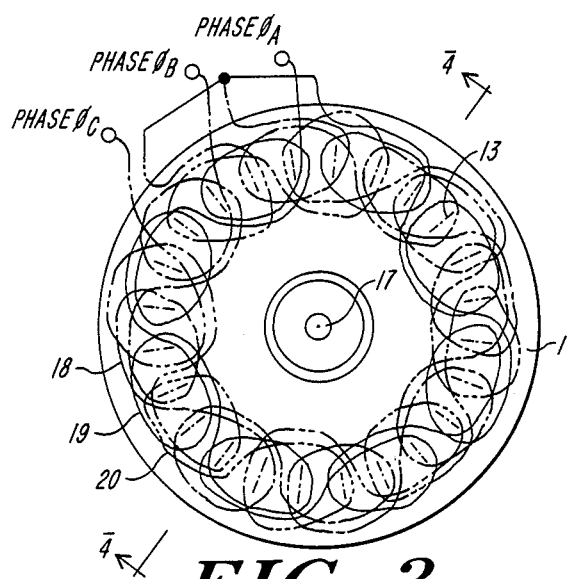
FIG. 3 is a schematic elevation of the stator portion of a prior art axial-gap, three-phase alternating-current motor constructed with eight poles.
Figure 4:
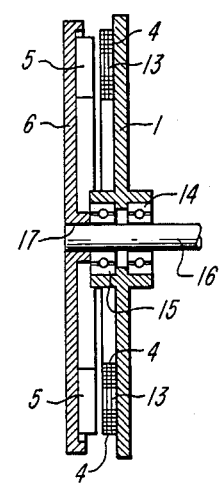
FIG. 4 is a schematic cross-sectional view taken along the section lines 4—4 of the axial gap motor shown in FIG. 3.
Figure 2:
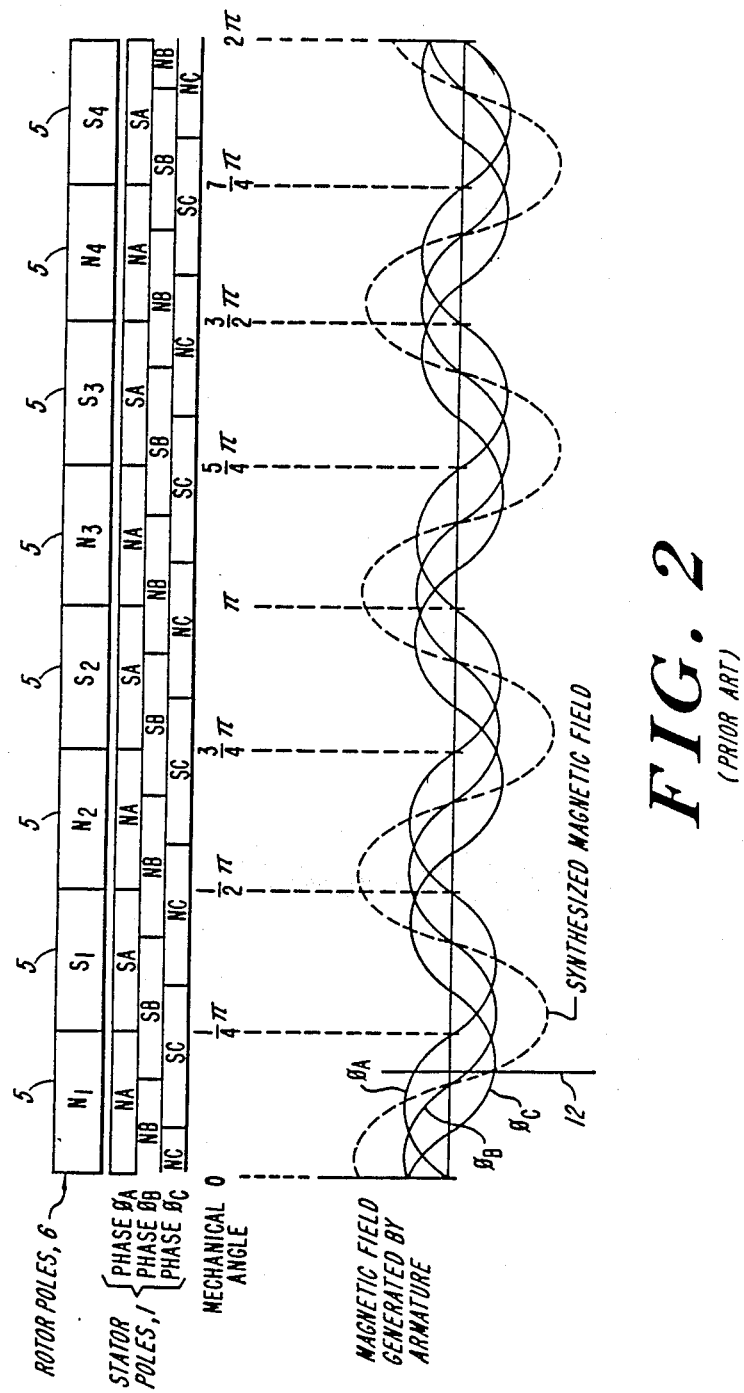
FIG. 2 is a schematic chart showing the mechanical locations of the effective poles on the rotor and stator and the magnetic fields produced by the windings at one instant of time in the motor of FIG. 1.
Figure 27:
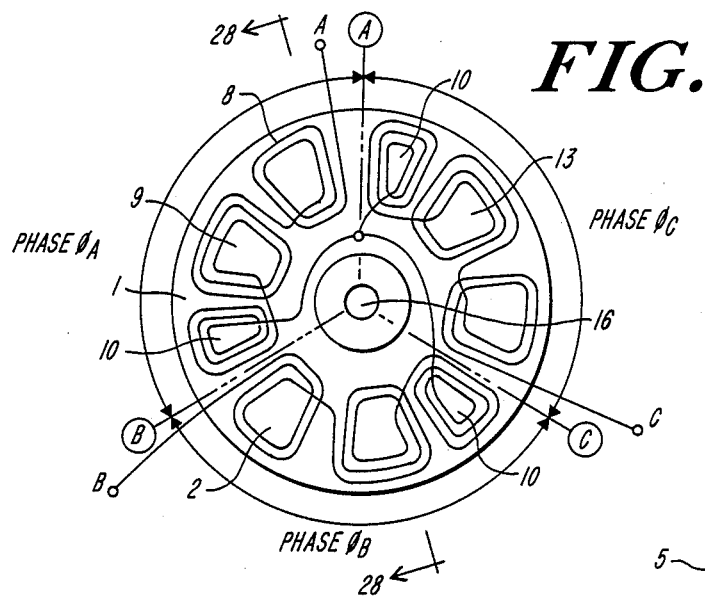
FIG. 27 is a schematic elevation of an axial-gap, three-phase alternating-current, motor constructed with eight poles in accordance with the invention.
Figure 28:
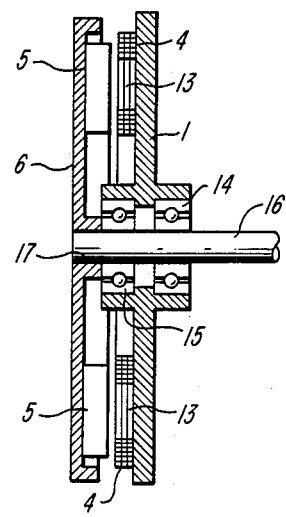
FIG. 28 is a schematic cross-sectional view of the axial gap motor shown in FIG. 27 taken along the sectional lines 28–28 in FIG. 27.

FIGS. 27 and 28 show the principles of the present invention applied to an eight-pole, three phase, alternating current axial-gap motor such as that shown in FIGS. 3 and 4. The mechanical construction of the motor shown in FIGS. 27 and 28 is similar to the mechanical construction of the motor shown in FIGS. 3 and 4 and similar parts have been given equivalent numbers. In accordance with the invention and as shown in the schematic elevation view of FIG. 27, the stator armatures are wound with non-overlapped windings. More specifically, in accordance with the equations developed above, there are nine stator poles which are divided into three groups. Each armature group is excited by current of a single phase and the windings are connected in a "wye" configuration with stator poles of alternating polarity.

Within each armature group, the armatures are arranged as two wide armatures and one narrow armature in a manner similar to the motor of FIG. 20. Thus for the axial gap motor of FIGS. 27 and 28, P=8, S=9, n=1, N=3 giving $C_w=45°$ from equation (7) and $C_n=30°$ from equation (6).

The linear diagrams for the three-phase axial-gap motor are identical for the equivalent radial-gap motor of FIG. 20.

The same motor structure shown in FIG. 20 can also be used to construct a brushless D.C. motor in accordance with the principles of the invention. More particularly, three "phases" of electrical current can be created from a D.C. power source by a plurality of switches controlled by sensors which sense the mechanical position of the rotor. The switches and sensors are conventional and will not be discussed in detail further.

In a brushless D.C. motor constructed with the rotor and stator structure shown in FIG. 20, the rotor position sensors are located about the periphery of rotor 6 at points 163, 164 and 165. These sensors may be conventional Hall-effect devices or optical devices which are sensitive to the magnetic poles 5 on rotor 6 and control switches that selectively connect three windings to a D.C. power source to excite the pole groups.

Figure 29:
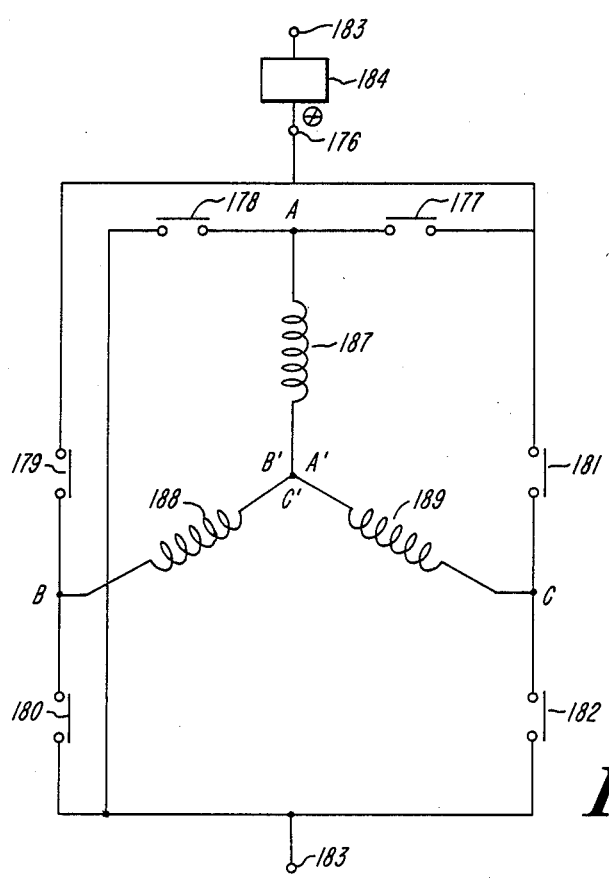
FIG. 29 shows an electrical schematic of windings and switches for a brushless D.C. motor using the physical rotor and stator arrangement of FIG. 20.

The electrical connection of the windings for the brushless D.C. motor are shown schematically in FIG. 29. The three windings 187, 188 and 189 are connected in a "wye" connection as shown in FIG. 20. The terminals A, B and C of the windings may be selectively connected to a D.C. power source 184 by means of six switches shown schematically as switches 177–182. Switches 177–182 are arranged in pairs and each switch pair is controlled by one sensor.

Specifically, the switch pair 177, 178 is controlled by position sensor 163. Switches 177 and 178 are arranged so that when one is closed, the other is open. Similarly, switch pair 179, 180 is controlled by rotor position sensor 164 and switch pair 181, 182 is controlled by sensor 165.

Figure 30:
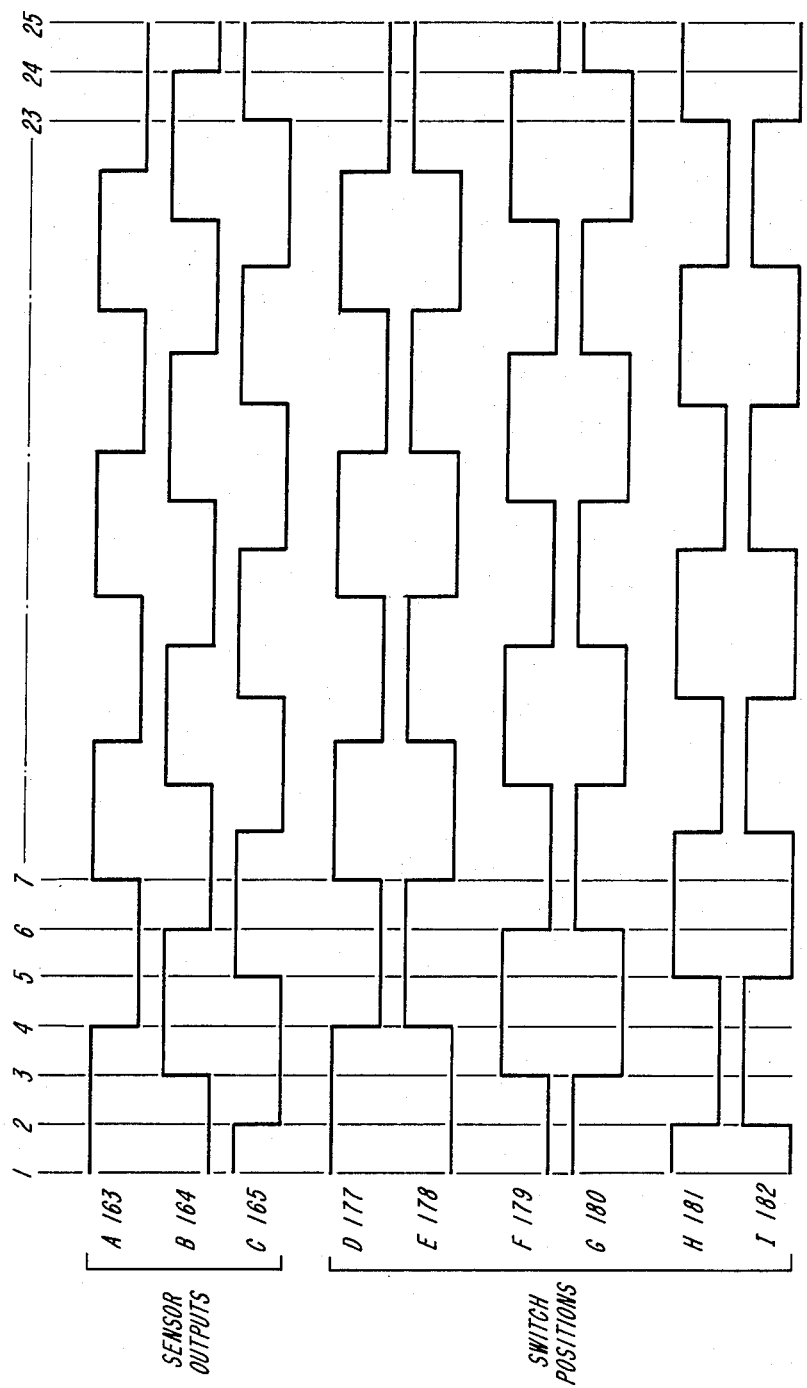
FIG. 30 is an electrical waveform diagram of signals produced by the stator winding switches and a schematic diagram of switch positions for the brushless D.C. motor of FIGS. 20 and 29.

The outputs of the position sensors and the open/closed status of switches 177–178 is schematically illustrated in FIG. 30 which shows sensor outputs and switch positions for twenty-four different rotor positions. As shown in FIG. 29, at each position rotor 6 advances in a counter-clockwise direction an angle of 15° from the position shown in the previous figure.

FIG. 30, line A, represents the output of position sensor 163 at different rotor positions. The output of the position sensor 163 is represented as "high" when the sensor is opposite a north magnetic pole on rotor 6 and is represented as "low" when the position sensor is opposite a south magnetic pole on rotor 6. At position 1, sensor 163 is located at the dividing line between a north and south rotor magnetic pole (shown in FIG. 20) and, therefore, sensor 163 is in transition from a "low" output to a "high" output as shown in FIG. 30, line A.

As shown in line B of FIG. 30, sensor 164 produces a "low" output because it senses a north pole (FIG. 20) and sensor 165 generates a "high" output in response to a south pole (line C of FIG. 30).

Each of position sensors 163–165 is connected to conventional and well-known electronic circuitry which, in turn, controls the operation of switches 177–182. Although switches 177–182 are shown schematically in FIG. 29 as mechanical switches, they may be electronic switches or thyristors in accordance with conventional construction.

Lines D–I of FIG. 30 schematically show the switch positions of switches 177–182 for 24 rotor positions. In lines D–I a "high" waveform indicates the associated switch is closed while a "low" waveform indicates that the associated switch is open. Thus, in line D at position 1, switch 177 is shown as changing from open to closed. Switch 178 is changing from closed to open (line E); switch 179 is open (line F); switch 180 is closed (line G); and switches 181 and 182 are closed and open (lines H and I, respectively).

At a position of the rotor which is slightly past position 1 (with switches 177 and 178 closed and open, respectively) the current flow in the stator windings can be traced on FIG. 29 as follows: Current flows from positive terminal 176 of power source 184 through closed switch 177 to point A. From point A current flows through winding 187 to point A'. The current flow then passes through winding 188 through closed switch 180 to the negative terminal 183 of source 184. Current also flows from positive terminal 176 of source 184 through switch 181 and winding 189 to point C' and from there to the negative terminal 183 of source 184 via winding 188 and switch 180.

Figure 31:
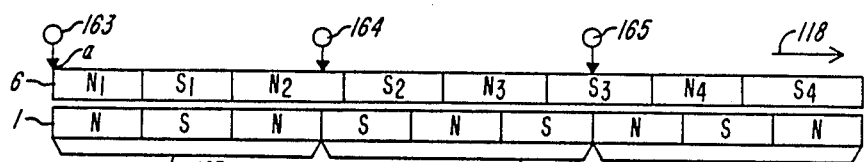
FIGS. 31–36 are schematic charts showing the mechanical location of the effective poles on the rotor and stator and the magnetic fields produced by the windings at several instants of time in the motor of FIGS. 20 and 29.
Figure 32:
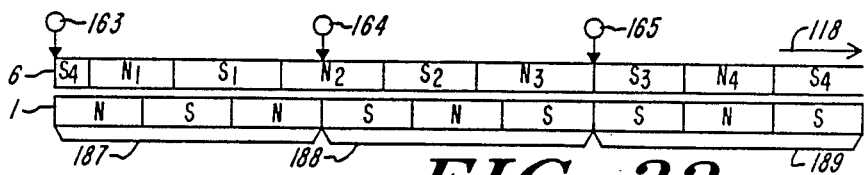
Figure 33:
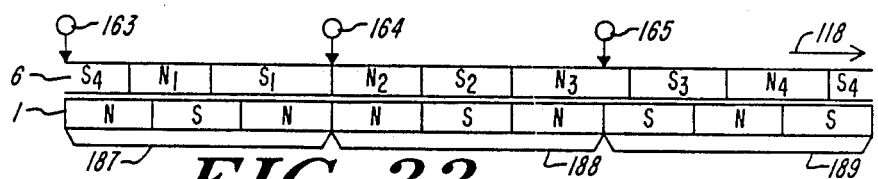
Figure 34:
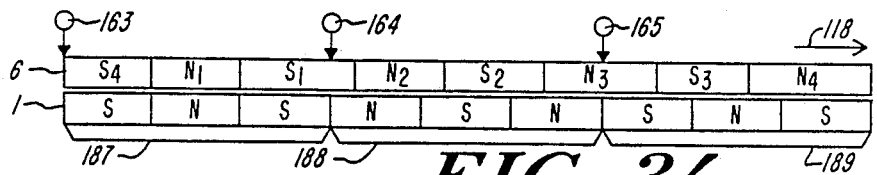
Figure 35:
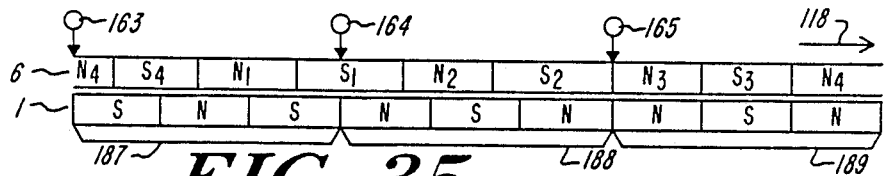
Figure 36:
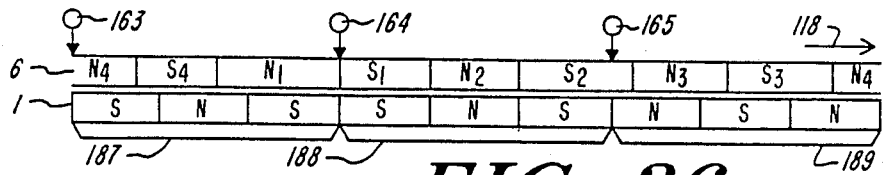

The magnetic poles produced on the stator by the current flow are shown in FIG. 31 which is a linear diagram of the rotor and stator poles (similar to the diagrams previously described in connection with the motor configurations shown in FIGS. 5, 13 and 20). In FIG. 31, the rotor position sensors are shown schematically as sensors 163, 164 and 165. the upper line represents the rotor poles 5 and the lower line represents the stator poles 2. Even though the current flow in each stator winding is in one direction, it should be noted that the poles in each pole group alternate in polarity due to reversal in winding direction between adjacent poles. In a manner similar to FIG. 31, FIGS. 32–36 show the arrangement of the rotor and stator poles at six different rotor positions as rotor 6 moves in the direction of arrow 118 in steps of 15° ($\pi/12$).

It has been found that with the optimum motor construction shown in FIGS. 20 and 29, motor performance is significantly improved over conventional design. For example, a typical measure of motor performance is defined as a motor constant that is equal to an output torque constant squared ($K_T^2$) divided by the winding resistance (R). With a motor constructed in accordance with the principles of the invention, the motor constant is approximately two times higher than a motor constant which can be obtained with any conventional designs.

Figure 37:
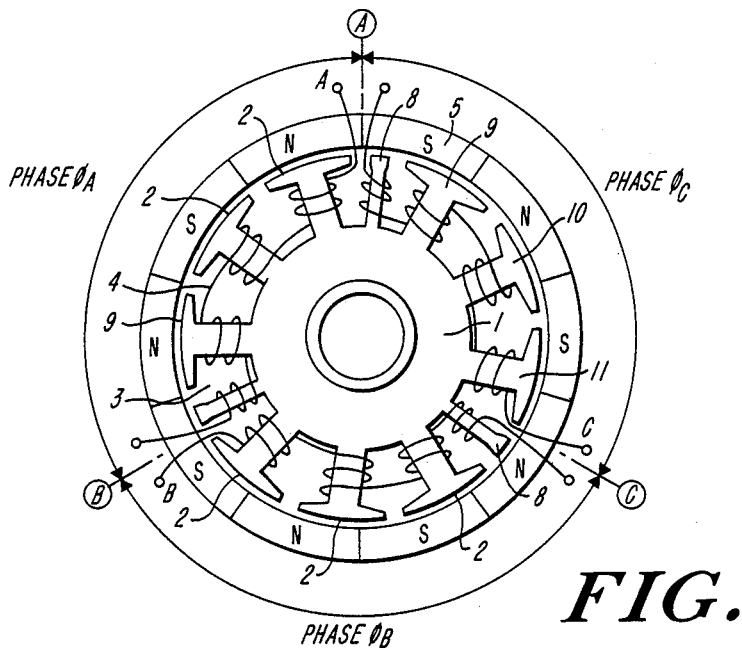
FIG. 37 is a schematic elevation of an alternative embodiment of a three-phase alternating current, ten-pole radial-gap motor constructed in accordance with the principles of the invention.

FIG. 37 shows a schematic elevation of a ten-pole, radial-gap, three-phase, alternating-current motor constructed in accordance with the principles of the invention using the optimal design equations. In this motor the phase multiplier k is chosen equal to "1" giving the mechanical phase number, Q=3. The pole number, n, is chosen equal to "2" giving the number of stator poles, S, equal to 12 from equation (2) (using the positive relationship). The number of poles per mechanical sector is four from equation (3).

From equation (6) the width of the narrow armature is 12° ($\pi/15$) and from equation (7) the width of the three (N−1) armatures is 36° ($\pi/5$). Thus, the total central angle spanned by one group of armatures is:

$$3 * \pi/5 + 1 * \pi/15 = 2\pi/3$$

This arrangement of armatures can be achieved using equations (4) and (5) using a ratio of $A_1:A_2:A_3:A_4 = 1:3:3:3$.

The operation of the three-phase, ten-pole motor is described, in connection with FIGS. 38–43 which are linear diagrams similar to FIGS. 6–11, 14–19, 21–26 and 31–36. At the instant of time portrayed in FIG. 38, the rotor magnetic pole S2 is attracted by the stator magnetic pole NB and repulsed by stator pole SA. Rotor pole N3 is repulsed by stator pole NB and is attracted by stator pole SB. Similarly, rotor magnetic pole S3 is repulsed by stator pole SB and is attracted by stator pole NB. The same relationship holds true for rotor poles N4, S4, N5 and S5. Thus these poles generate a torque output to rotate rotor 6 in the direction of arrow 30 in FIG. 38.

Figure 38:
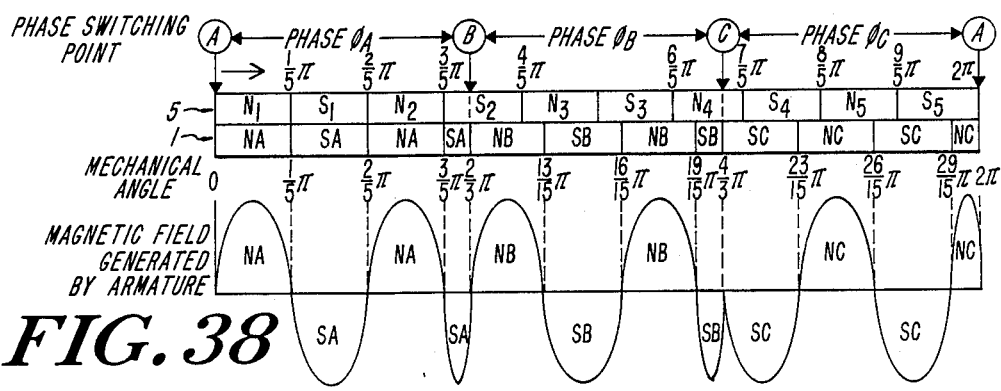
FIGS. 38–43 are schematic charts showing the mechanical locations of the effective poles on the rotor and stator and the magnetic fields produced by the windings at several instants of time in the motor of FIG. 37.

Rotor poles N1, S1 and N2 act as neutral zones and do not generate a torque output at the instantaneous time shown in FIG. 38. However, once rotor 6 has slightly moved in the direction of arrow 30, rotor pole N1 will be repulsed by stator pole NA and attracted by stator pole SA; rotor pole S1 will be repulsed by stator pole SA and attracted by stator pole NA, and thus, the respective magnetic poles in the rotor 6 interact with the stator poles to generate a torque output that rotates rotor 6 rightward in FIG. 38.

Figure 39:
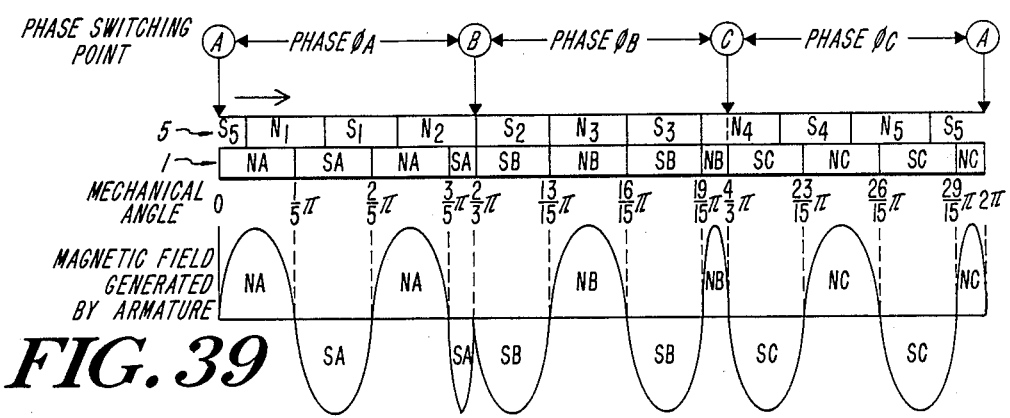
Figure 40:
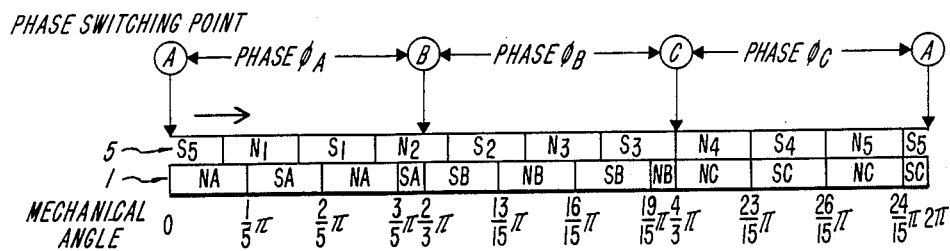
Figure 41:
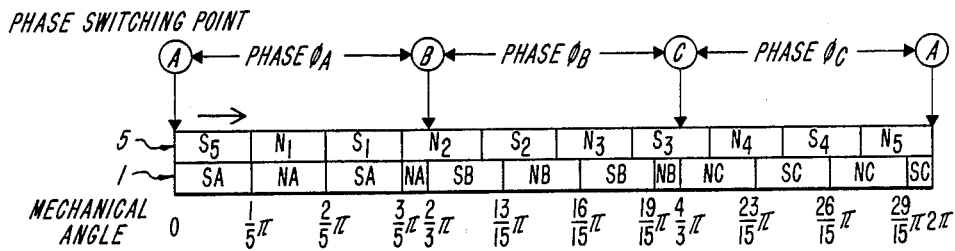
Figure 42:
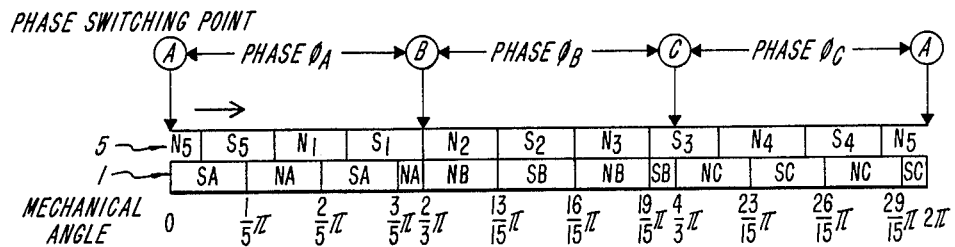
Figure 43:
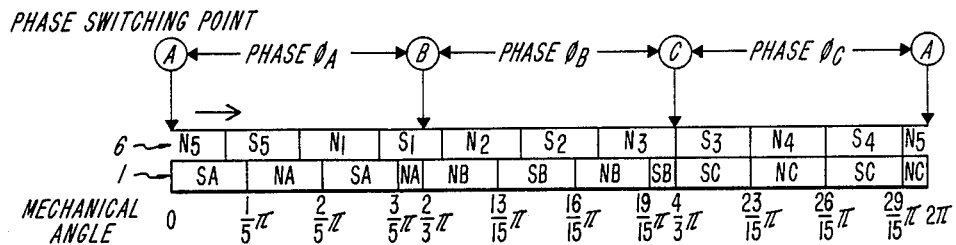

FIG. 39 shows the motor at a slightly later instant of time in which rotor 6 has moved in a rightward direction by an angle of $\pi/15$. The phase of currents flowing in the armatures 2 advances by an electrical angle of $\pi/3$ and the direction of the magnetic field of the armature group excited by phase $\phi B$ reverses.

FIGS. 39–43 show the polarities of the rotor poles 5 and the armature poles of the stator 1 at successive instants of time. At each instant of time, rotor 6 advances rightward by an angle of $\pi/15$ relative to the previous figure, and the phase of the exciting currents flowing in the armatures 2 of the stator 1 advances by an electrical angle of $\pi/3$. The components of the motor and their interaction in FIGS. 38–43 correspond to the previous linear diagrams and will not be further discussed in detail herein.

In some cases the previous embodiments may produce unwanted stresses on the rotor bearings. These stresses result from the radial forces generated by those rotor/stator pole pairs which are in "neutral zones". In these areas the attractive/repulsive forces between the rotor and stator poles do not contribute to output torque, but rather to a radial force which produces a unwanted force on the bearings. Such a force may result in premature failure of the rotor bearings or uneven operation of the motor.

Figure 44:
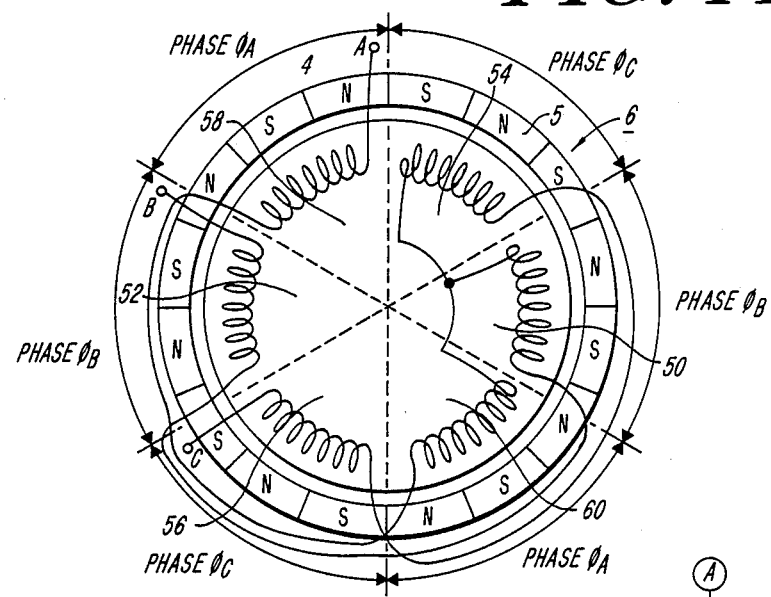
FIG. 44 is a schematic elevation of an alternative embodiment of a three-phase alternating current, sixteen-pole radial-gap motor constructed in accordance with the principles of the invention and utilizing split equalized windings in accordance with another aspect of the invention.

FIG. 44 shows another embodiment of a radial-gap three-phase alternating-current motor in which the radial forces has been minimized. FIG. 44 shows a schematic elevation of a motor in which the stator windings are schematically shown for each mechanical phase sector and the physical stator armatures have been omitted for clarity. Within each sector, the armature windings would be wound around the armatures for each mechanical phase in accordance with the principles of the invention as previously discussed. The widths of the stator poles are determined by equations (6) and (7) as previously described. However, in the motor of FIG. 44, the number of poles has been doubled from eight (as shown in FIGS. 20 and 29) to sixteen and the phase multiplier, k, has been increased from "1" to "2" thus doubling (in accordance with equation (1)) the number, Q, of mechanical phases from three as in the FIG. 20 motor to six.

From equation (2), the number of stator poles, S=18 (assuming n=1), and from equation (3) the number, N, of stator poles per mechanical sector is three. Equation (6) gives the width of the narrow pole in each mechanical sector as 15° ($\pi/12$) and equation (7) gives the width of the three wide poles in each sector as 22.5° ($\pi/8$).

In accordance with one aspect of the invention, in order to reduce bearing stress, two of the six mechanical sectors are excited by the same phase of the exciting current and these sectors are arranged (as shown in FIG. 44) on the stator symmetrically about the axis of rotation. For example, mechanical phases or sectors 58 and 60 are excited by currents having electrical phase $\phi A$ and are located at radially-opposing points of the stator. If the mechanical phases are connected in a "wye" configuration, the radially opposing sectors are electrically connected in series as shown in FIG. 44 to generate radially-opposing forces. If the mechanical sectors are connected in a delta configuration, then the radially opposing sectors are not connected electrically in series, but are connected so that currents of the appropriate exciting phase pass in the same direction through the windings to generate opposing forces.

When the stator is arranged in this fashion, it is symmetrical and any radial forces generated by "neutral zones" in sector 58 will be cancelled by opposing radial forces generated by "neutral zones" in sector 60. Similarly, radial forces generated by sector 52 will cancel forces generated by sector 50 and forces generated by sectors 56 and 54 will cancel. Thus, the overall stress on the bearings can be reduced. Similar results can be achieved by varying the value of the phase multiplier, k to include other values. For example, the phase multiplier, k, may be set to 3 and the three pole groups associated with each phase may be arranged symmetrically around the axis of rotation to generate opposing forces which have radial components that tend to cancel each other.

Figure 45:
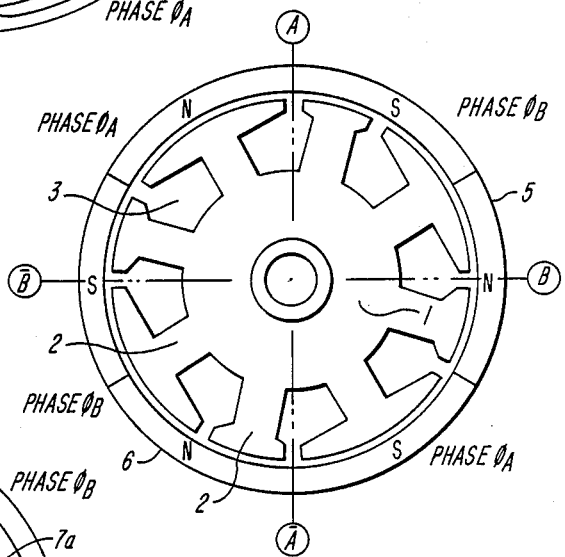
FIG. 45 is a schematic elevation of an alternative embodiment of a two-phase alternating current, six-pole radial-gap motor constructed in accordance with the principles of the invention.

FIG. 45 is a schematic elevation of a six pole, two-phase, radial-gap alternating current motor constructed in accordance with the principles of the invention. In this motor, rotor 6 is chosen to have six poles (P=6) with an angle of 360°/6=60° occupied by each pole. The pole number, n, is chosen to be "1" and the phase multiplier, k, is chosen to be "2". Equation (1) gives the mechanical phase number, Q=4 since there are two phases in the exciting current (M=2). Equation (2) indicates that stator 1 will have a total of 8 armatures 2 and 2' and equation (3) gives the number of armatures per mechanical phase, N=2. In accordance with equation (7), the center angle spanned by the wide armature is 60° and the angle occupied by the narrow armature is 30° (from equation (6) in each mechanical phase. As with the embodiment shown in FIG. 44, if windings are connected in a "wye" configuration, the windings of radially opposing sectors are wired in series to produce radially opposing forces.

Figure 46:
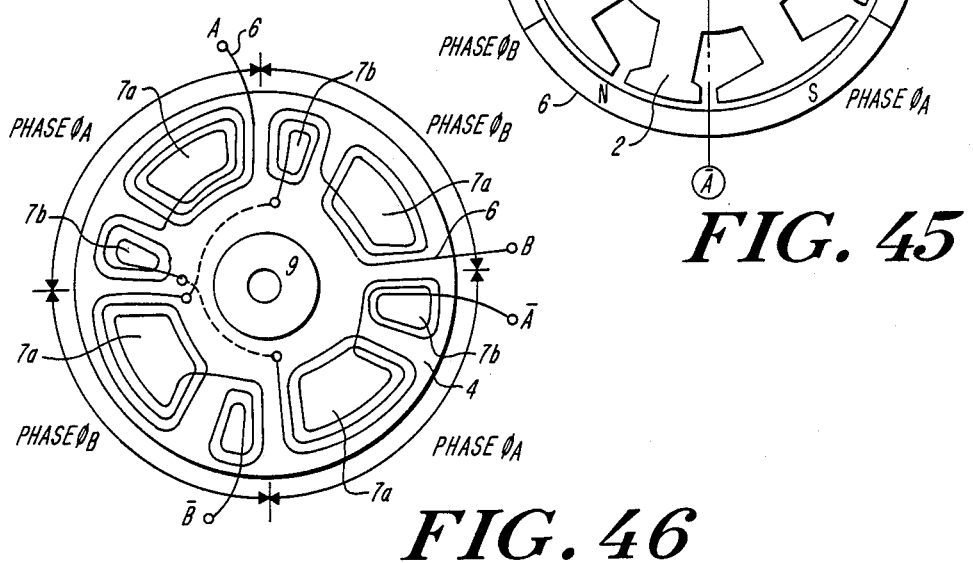
FIG. 46 is a schematic elevation of an alternative embodiment of a two-phase alternating current, six-pole axial-gap motor constructed in accordance with the principles of the invention.

FIG. 46 shows the principles of the invention applied to a six-pole, two-phase alternating-current axial-gap motor in which the mechanical construction is similar to the motor shown in FIGS. 3 and 4. In FIG. 46, for clarity, only the stator windings are shown and the physical stator poles have been omitted.

As with the previous two embodiments, the mechanical phase multiplier, k, has been chosen to be equal to two to produce balanced forces on the rotor bearings. The number of rotor poles (P) is chosen to be six. From equation (1) the mechanical phase number, Q=4 and from equation (2) the number of stator poles is equal to eight (S=8 with n=1). Equation (4) gives the number of poles per mechanical phase, N=2 and from equations (6) and (7), the width of the "narrow" stator poles is equal to 30° and the width of the "wide" stator poles is equal to 60°. In FIG. 46, the stator windings in radially opposing sectors are connected in series (due to the "wye" configuration) for each of the two phases $\phi A$ and $\phi B$ in order to obtain the benefits of cancellation of radial forces.

Figure 47:
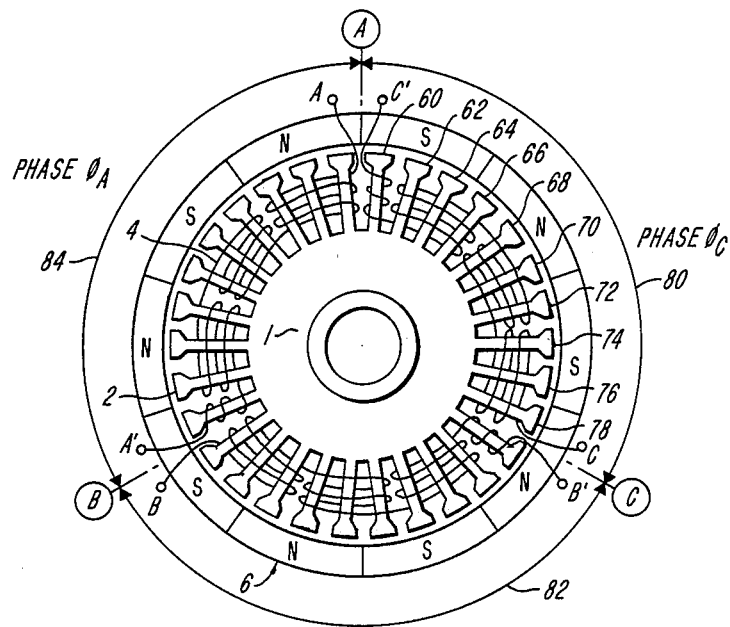
FIG. 47 is a schematic elevation of an alternative embodiment of a three-phase alternating current, ten-pole radial-gap motor in which a conventional stator has been wound according the principles of the invention to generate higher starting torque.
Figure 48:
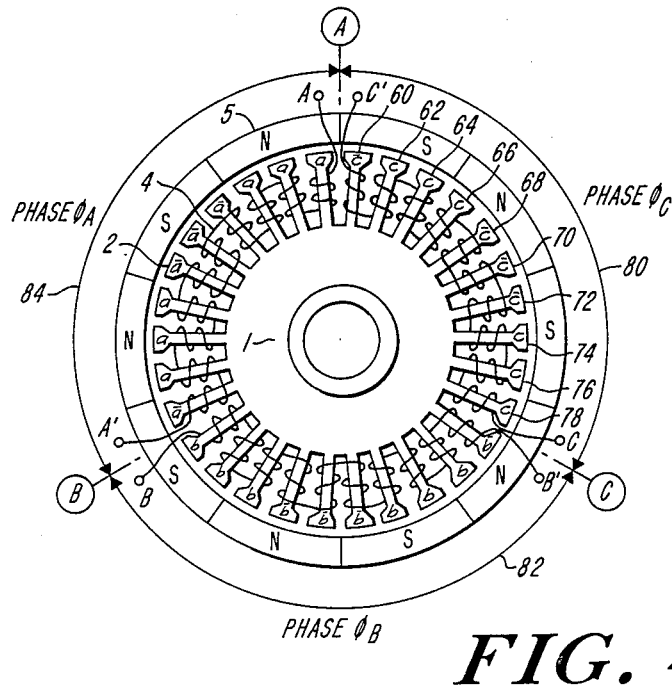
FIG. 48 is a schematic elevation of an alternative embodiment of a three-phase alternating current, ten-pole radial-gap motor in which a conventional stator has been wound according the principles of the invention in a manner alternative to that of FIG. 47 to generate higher starting torque.

FIGS. 47 and 48 show the application of the inventive principles to conventional stator constructions in which the stator armatures are all of equal physical width. With this construction, the advantages of the present invention can be obtained by winding groups of armatures together to produce "effective" poles whose widths are unequal. In particular, in FIG. 47, rotor 6 has ten poles of equal width, each of which spans a center angle of 36°. The poles are arranged in alternating fashion as previously described in connection with the previous embodiments.

In accordance with the invention, equation (2) indicates that the number of stator poles (S) should be equal to 12 (for k=1 and n=1). Equation (3) indicates that the number of poles per phase is equal to 4 and the optimal torque equations (6) and (7) give the width of the narrow pole, $C_n = 12°$ and the width of the three "wide" poles, $C_w = 36°$. Accordingly, the optimal motor equations (6) and (7) dictate a motor design similar to that shown in FIG. 35.

However, in FIG. 47, a conventional stator having 30 armatures which span equal center angles of 12° is used and the armatures are wound in such a manner to produce 12 "effective" poles which have the widths dictated by equations (6) and (7).

More particularly, in accordance with the principles of the invention, the stator is divided into three mechanical phases each of which spans a center angle of 120° (Q=3 from equation (1)). Each mechanical phase is energized by one phase of the exciting current. Thus, for example, mechanical phase 80 shown in FIG. 47 is excited by electrical phase $\phi C$ of the exciting current. Within mechanical phase 80, there are ten stator armatures and these are wound to produce four "effective" poles arranged in a ratio of 1:3:3:3.

Specifically, armature 60 is wound as a single armature and produces a single pole spanning a center angle of 12°. Armatures 62, 64 and 66, however, as shown in FIG. 47, are wound together to produce the effect of a single magnetic pole. This pole has the effective width of three times the mechanical angle spanned by each of the poles or (3)(12°)=36°. Similarly, armatures 68–72 are wound as a single unit and armatures 74–78 are wound to produce an effective pole of three times the armature width. As shown, the armatures are wound to produce magnetic poles of alternating polarities.

The same winding arrangement is also used in mechanical phases 82 and 84 and, thus, the resulting stator has the same magnetic characteristics as if the stator armatures had physical widths in the ratio of 1:3:3:3 with the armature windings passing separately around each of the armatures.

With such a winding arrangement, it is possible to apply the principles of the present invention to existing motors which must be rewound provided that the rotor poles and the stator armatures have the proper ratio.

FIG. 48 shows an alternative stator winding scheme which produces the same magnetic pole arrangement as the windings in FIG. 47. In particular, armature 60 is wound to produce a single pole spanning a center angle of 12° while armatures 62, 64 and 66 are each individually wound to produce an effective magnetic pole spanning a center angle which is three times the center angle spanned by each individual armature. Similarly, armatures 68, 70 and 72 are wound to produce a single effective magnetic pole having the same width as the magnetic pole produced by armatures 62–66. Armatures 74–78 also are wound to produce an effective magnetic pole equal to the width of three armatures. The winding arrangement shown in FIG. 48 has the advantage that the armature windings pass around only one armature (although the direction and arrangement of the windings is such to produce poles of unequal effective width and alternating polarity in accordance with the invention). Thus the motor shown in FIG. 48 may be easier to manufacture than the motor shown in FIG. 47.

FIGS. 49(A)–(C) illustrate the principles of the present invention as applied to a direct-current commutator motor. In particular, FIG. 49 shows a "three-phase" mechanical-brush commutator motor of eight poles illustrated schematically in linear fashion as previously described. The illustrative motor has a permanent magnetic eight-pole stator 1 with poles 2 and a wound rotor which, in accordance with the principles of the invention, (from equation (2)) has nine rotor armatures 5.

The motor is arranged with stator 1 located around the periphery of the rotor 6. Rotor 6 is attached by bearings in a stationary frame (not shown). Mounted on the rotor 6 are a plurality of standard commutator bars, 150–172, which rotate with rotor 6. Bars 150–172 may be conventional copper bars arranged around the axis of rotor 6. In conventional fashion, commutator bars 150–172 are connected to the rotor windings to provide power to the windings.

In a similar fashion to the previous motor embodiments constructed in accordance with the invention, the nine rotor armatures, 5, are divided into three mechanical phase groups (Q=3), each of which contains three armatures (N=3). In accordance with equations (6) and (7), the width of the armatures is constructed to be in the ratio of 2:3:3 as shown in FIG. 49(C). More particularly, two of the armatures span center angles of 45° while the third armature in each mechanical phase spans a center angle of 30°.

Each of the armatures 5 is wound with a many-turn winding which is schematically shown as a single-turn hexagonal shape (windings 90–106). The "width" of each hexagonal shape schematically illustrates the corresponding physical width of the associated armature. In accordance with the principles of the invention, the armature windings for each mechanical phase are connected in series although the direction of the windings is changed as shown to produce magnetic poles having an alternating magnetic polarity. For example, windings 90–94 associated with mechanical phase A are electrically connected in series as a group. Similarly, windings 96–100 associated with mechanical phase B are connected in series and windings 102–106 associated with mechanical phase C are also connected in series.

Each of the winding groups is, in turn, connected to the commutator bars 150–172 in the manner shown in FIG. 49(A). Commutator bars 150–172 are contacted by brushes 180 and 182 which illustratively may be comprised of a carbon, or a carbon-composition material in accordance with conventional motor construction.

Brushes 180 and 182 are, in turn, connected to a source of direct current 200 which provides the motive power to the motor. The connections of the rotor windings 90–106 to commutator bars 150–172 are such that the windings comprising the three mechanical phases are connected in a "delta" connection as shown in the phase diagram in FIG. 49(B). The points labeled p, q and m as shown in FIG. 49(B) correspond to the similarly labeled commutator bar sections shown in diagram 49(A).

More particularly, as shown in FIG. 49(B) current from source 200 passes from point q through the windings of mechanical phase C and the windings of phase A to point p. Current also passes from point q directly through the windings of phase B to point p.

The corresponding current path can be traced in FIG. 49(A). In particular, current from source 200 passes through brush 182 to commutator bar 154 and from commutator bar 154, via connections 300 and 302, to winding 102. Winding 102 is connected to winding 104 by connection 304 and, in turn, winding 104 is connected to winding 106 by connection 306. As shown in FIG. 49, the direction of the windings between the three armatures associated with a mechanical phase is reversed to produce magnetic poles of alternating polarity (windings 102 and 106 are wound in reverse direction from winding 104).

The current then passes, via connection 308, to the windings associated with mechanical phase A. More particularly, current passes through windings 90, 92 and 94 which are, in turn, connected by connection links 310 and 312. The current then passes through connections 314 and 316 to commutator bar 152 and to the negative side of source 200, via brush 180.

Current from commutator bar 154 also passes, via connections 300 and 318, directly through the windings of mechanical phase B as shown in diagram 49(B). More particularly, the current from connection 318 passes through windings 100, 98 and 96, via connections 320 and 322. From winding 96 current passes, via connections 314 and 316, to commutator bar 152.

As shown in FIG. 49(A) the magnetic poles produced by armature windings 90, 92 of the rotor are in a "neutral" zone and do not cotribute to the output torque. However, the poles produced by armature windings 96–100 in phase B and windings 102–106 in mechanical phase C do contribute to the output torque in varying degrees depending on their offset from the corresponding stator poles. The torque produced by windings 94–106 tends to rotate rotor 6 in the direction of arrows 91 (to the left) Commutator bars 150–172, of course, also move to the left.

Figure 50A:
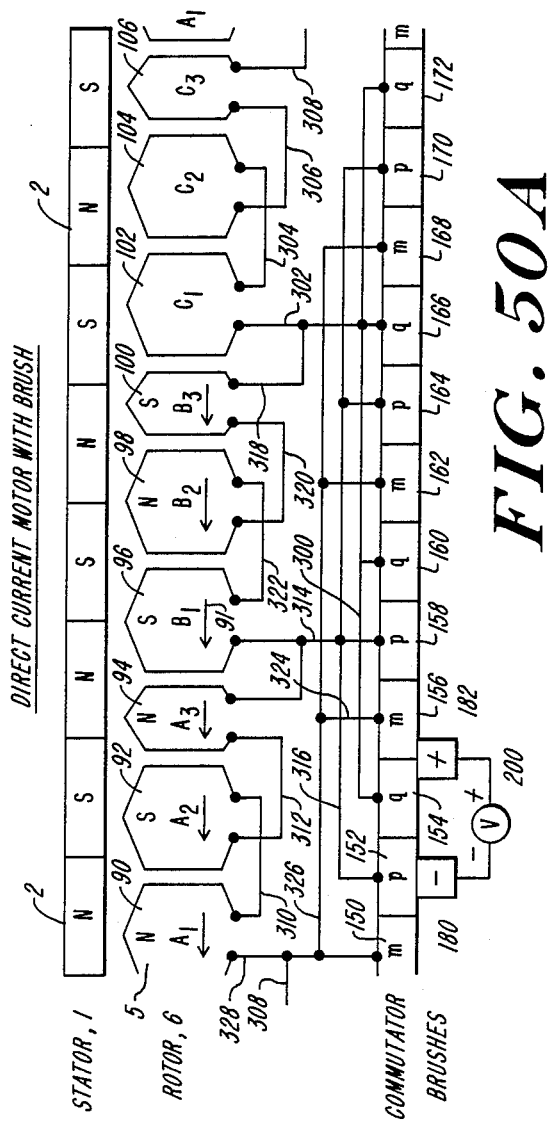
Figure 50B:
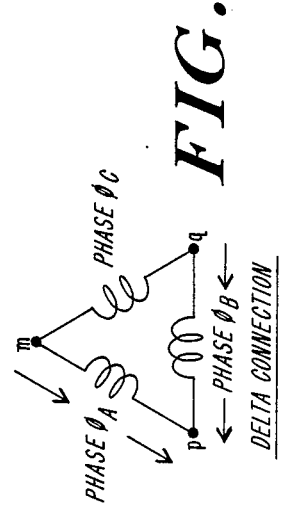

FIG. 50 shows the motor of FIG. 49 at a point in time at which rotor 6 has rotated 7.5° to the left. At this time, brush 180 has moved to the center of commutator bar 152 while brush 182 now electrically shorts commutator bars 154 and 156. In this position, as shown by the phase diagram in FIG. 50(B), the windings of mechanical phase C are shorted and current does not flow. Current instead flows from point m through the windings of phase A to point p and from point q through the windings of phase B to point p.

In particular, referring to FIG. 50(A), current passes from brush 182 through commutator bar 156 and connections 324, 326 and 328 to the windings 90–94 of mechanical phase A. From there, current passes, via connections 314 and 316, to commutator bar 152 and, via brush 180, to current source 200.

Similarly, current flows, via connections 300 and 318 to the windings 100–96 of mechanical phase B and returns, via connections 314 and 316, to commutator bar 152. The windings 102–106 of mechanical phase C are shorted by brush 182 which shorts commutator bars 154 and 156.

In this rotor position, armature windings 90–100 interact with the stator poles to produce a leftward torque on the rotor as shown by arrows 91 in FIG. 50(A). Armature windings 102–106, not being energized, do not contribute output torque.

FIG. 51 shows the motor in a position in which the rotor has rotated an additional 7.5° to the left from its position in FIG. 50. As shown in the phase diagram in FIG. 51(B) current passes from point m through the windings of phases C and B to point p and from point m directly through the windings of phase A to point p.

As shown in FIG. 51(A), the rotor 6 has moved so that brush 180 is now located at the right hand edge of commutator bar 152 while brush 182 has moved to the left portion of commutator bar 156. In this position, current passes from commutator bar 156, via connections 324, 326 and 308, to the windings of phase C. From the phase C windings, current passes through connection 318 to the windings of phase B and returns, via connections 314 and 316, to commutator bar 152.

Current also passes, via connections 324, 326 and 328, to windings of phase A and returns, via connections 314 and 316, to commutator bar 152.

In this rotor position, armatures 90, 100 and 106 produce an output torque, while armatures 102–104 lie in "neutral" zones and do not contribute to the output torque. Nevertheless, an overall leftward torque is produced which continues the movement of the rotor 6 in the left direction. In addition, the polarity of the magnetic poles of phase C has been reversed due to the commutator motion.

Figure 52A:
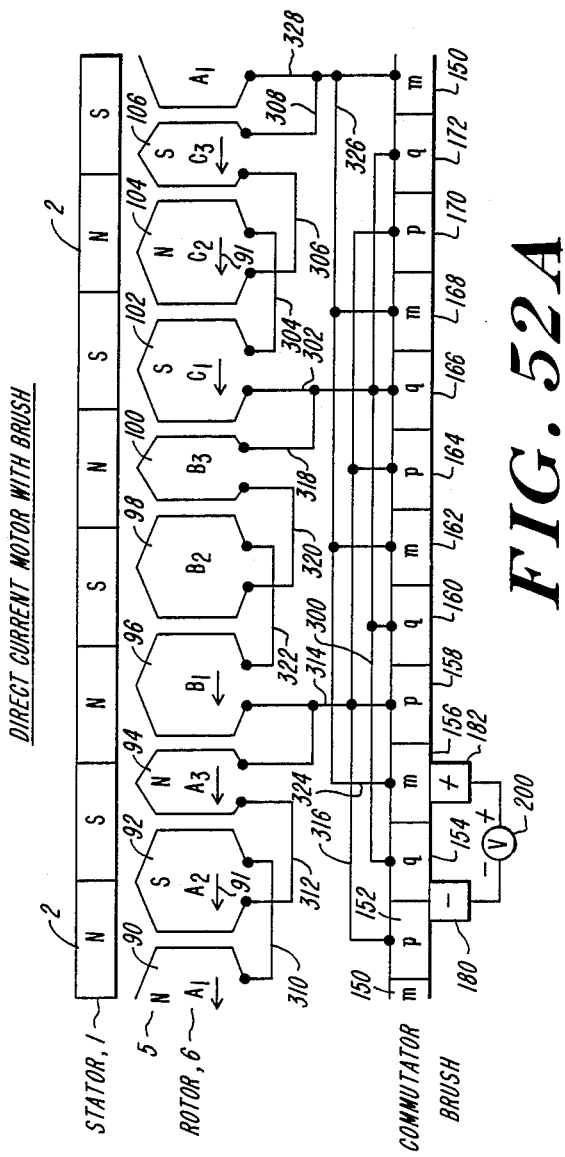
Figure 52B:
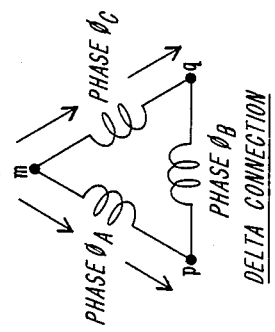

FIG. 52 shows a schematic diagram of the motor in which the rotor 6 has moved an additional 7.5° to the left from the position shown in FIG. 51. Brush 180 now spans commutator bars 152 and 154 and brush 182 is located in the center of commutator bar 156. As shown in FIG. 52(B) current flows from point m directly through the phase A and phase C windings to points p and q. The phase B windings are shorted out by brush 180 and do not contribute to the output torque. The current flow through the windings of phases A, B and C can be traced in a manner similar to FIGS. 49–51.

In FIG. 53, rotor 6 has again advanced to the left by an angle of 7.5° relative to FIG. 52. In this case, brush 180 is located at the left-hand portion of commutator bar 154 and brush 182 is located at the right hand portion of commutator bar 156. As shown in FIG. 53(B), current flows from point m through the phase A and phase B windings to point q and current flows directly through the phase C windings to point q. At this point in the rotation, the output torque is produced by windings 90–94 and 100–106; windings 96–98 being in "neutral" zones.

Figures 54A, 54B:
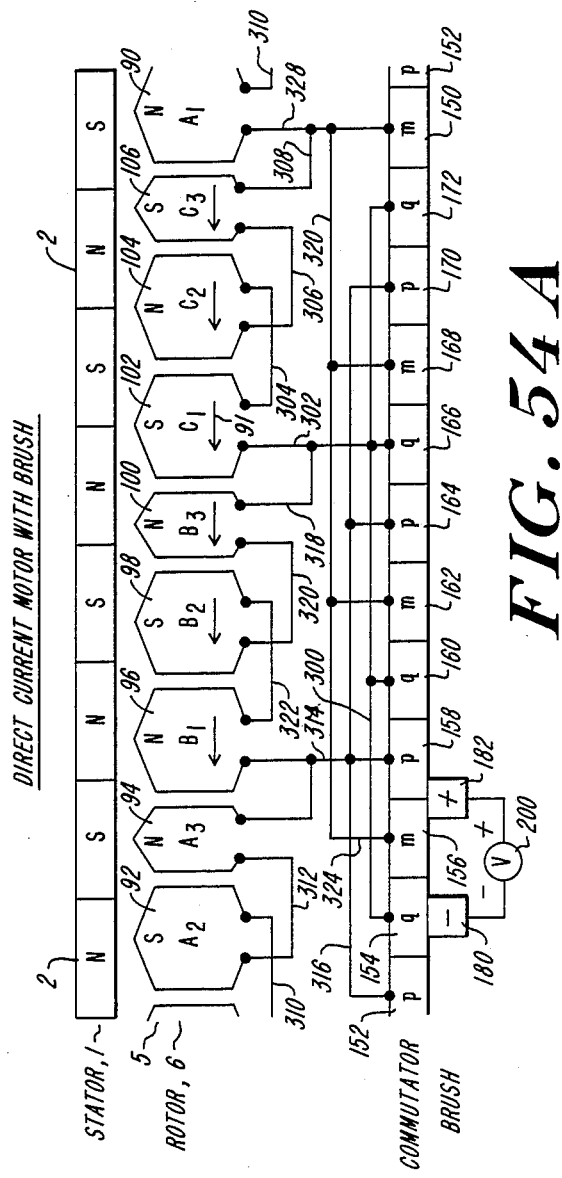

In FIG. 54, the motor is shown with the rotor moved to the left by an additional angle of 7.5° with respect to FIG. 53. As shown in FIG. 54(A) the phase A windings are now shorted by brush 182 which spans commutator segments 156 and 168. In FIG. 54(B) current passes from point m through the phase C windings directly to point q and from point p directly through the phase B windings to point q causing windings 96–106 to produce a leftward torque.

Figure 55A:
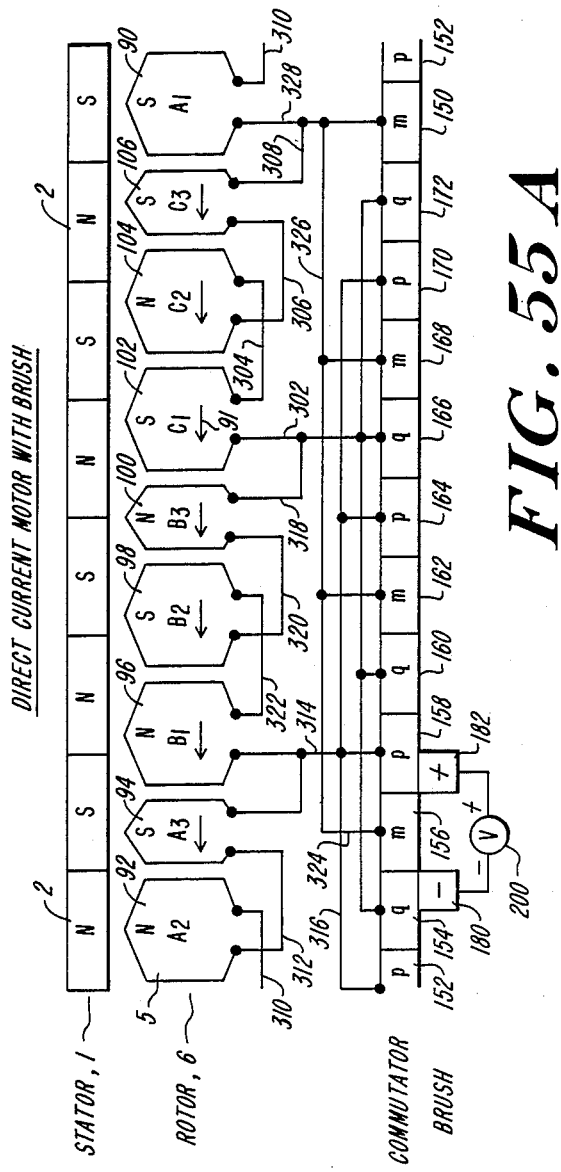
Figure 55B:
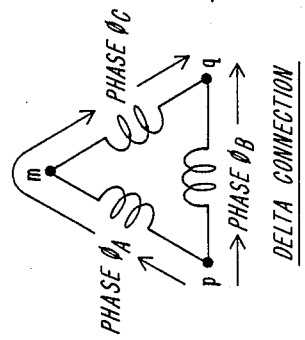

In FIG. 55, rotor 6 has again moved to the left by a step of 7.5° causing brushes 180 and 182 to advance to commutator bars 154 and 158, respectively. As shown in FIG. 55(B), current passes from point p through the windings of phase A and phase C to point q. Current also passes from point p directly through the phase B windings to point q. Torque is produced by windings 94–104; windings 90 and 92 being in neutral zones.

Figure 56A:
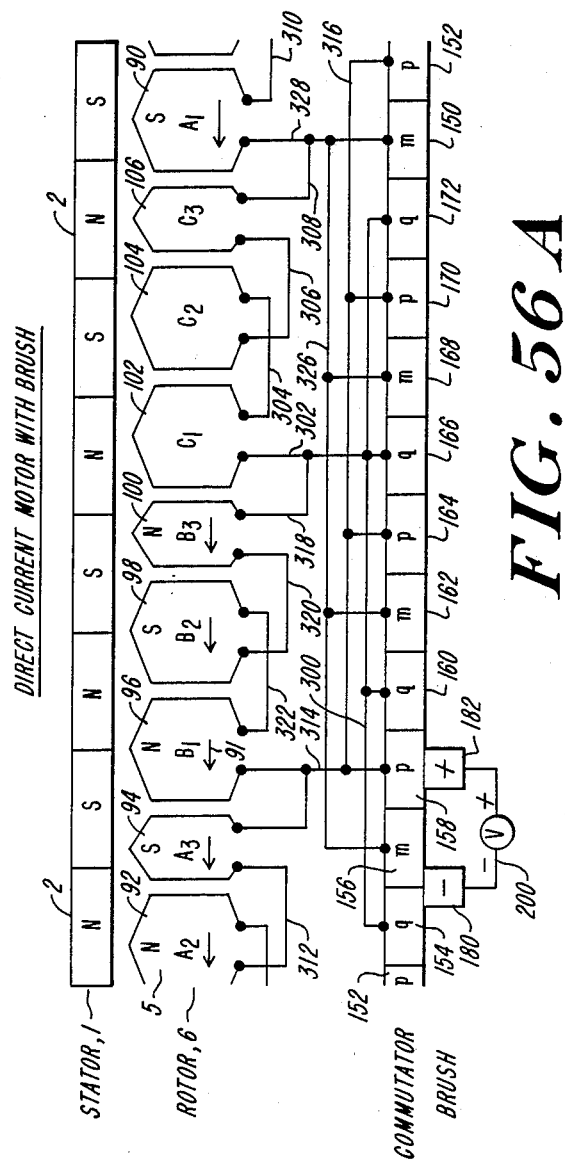
Figure 56B:
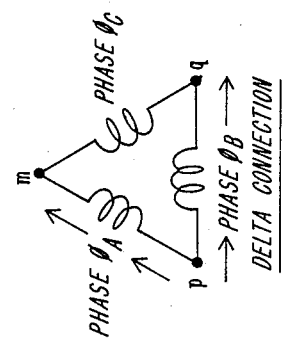
Figure 57A:
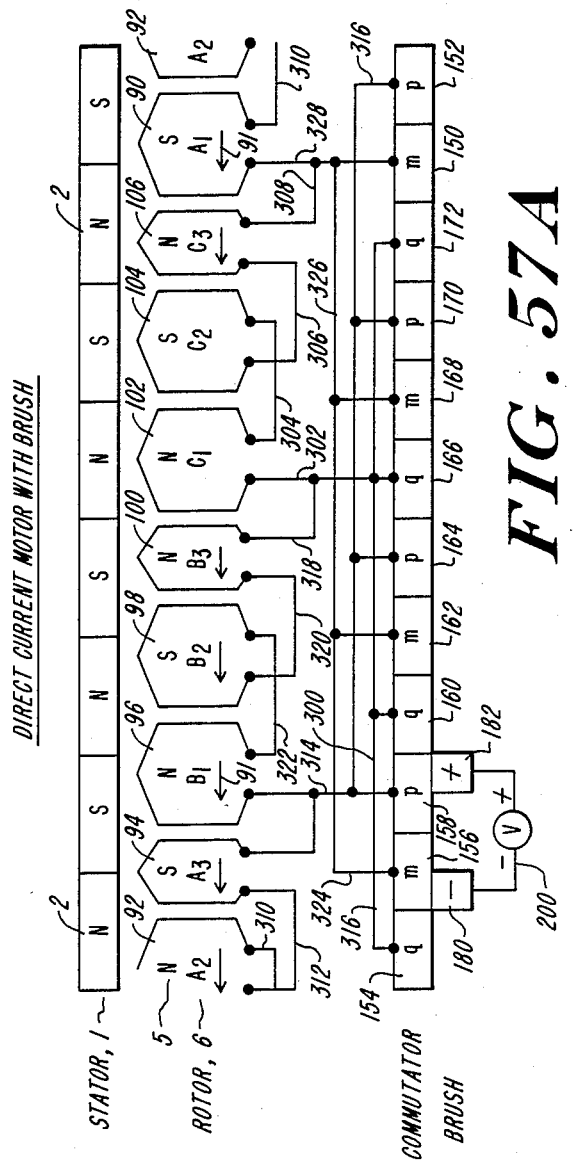
Figure 57B:
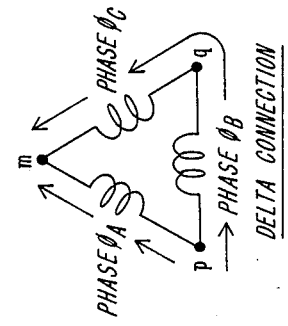
Figure 58A:
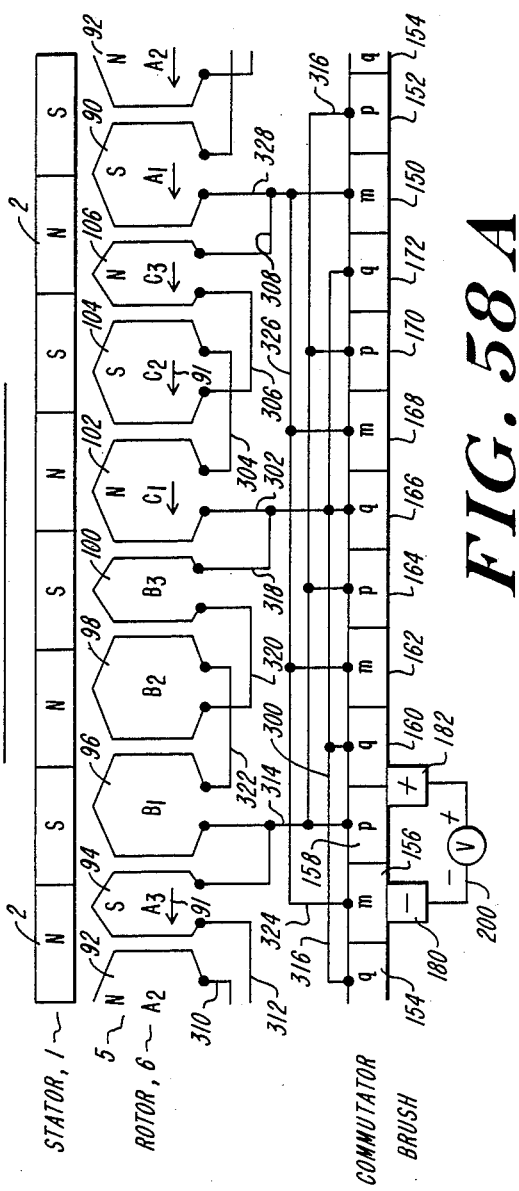
Figure 58B:
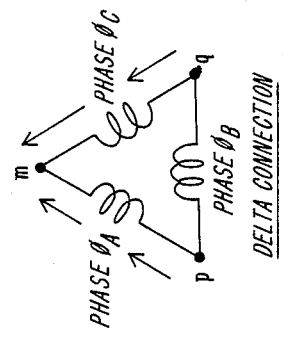

FIG. 56 shows the next step in the rotation of rotor 6 in which brushes 180 and 182 advance to commutator bars 154, and 158, respectively. In this rotor position, brush 180 shorts out the windings of the phase C portion of the rotor and current passes directly from commutator bar 158 through the phase A windings and the phase B windings to commutator bars 156 and 154 respectively. The torque-generating windings are, thus, windings 90–100.

In FIGS. 57–60 the rotor again advances in a leftward direction by steps of 7.5°. In each case a leftward torque is produced by an interaction between the stator poles and a plurality of the rotor windings. Although, in each case, some windings are in a "neutral" zone or the windings are shorted out by the brushes, a substantial output torque is developed by the remaining windings and there is no position in which a leftward torque is not produced. Consequently, the motor cannot lock upon starting.

Figure 60A:
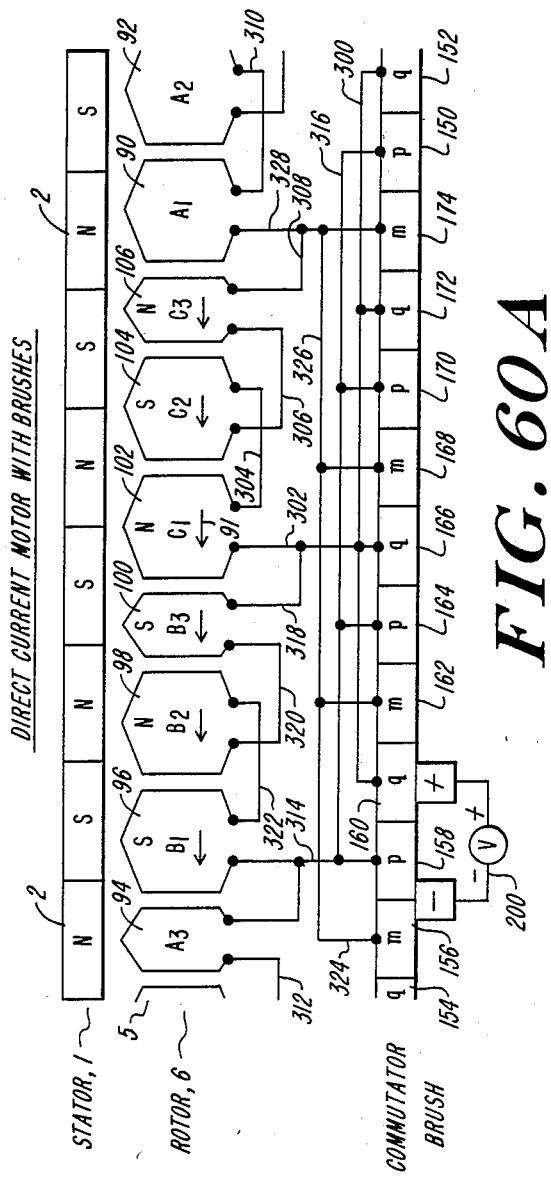
Figure 60B:
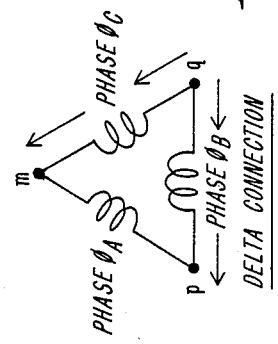

After the rotor position shown in FIG. 60, the motor returns to the rotor position shown in FIG. 49 and the cycle then repeats itself indefinitely.

Figure 61A:
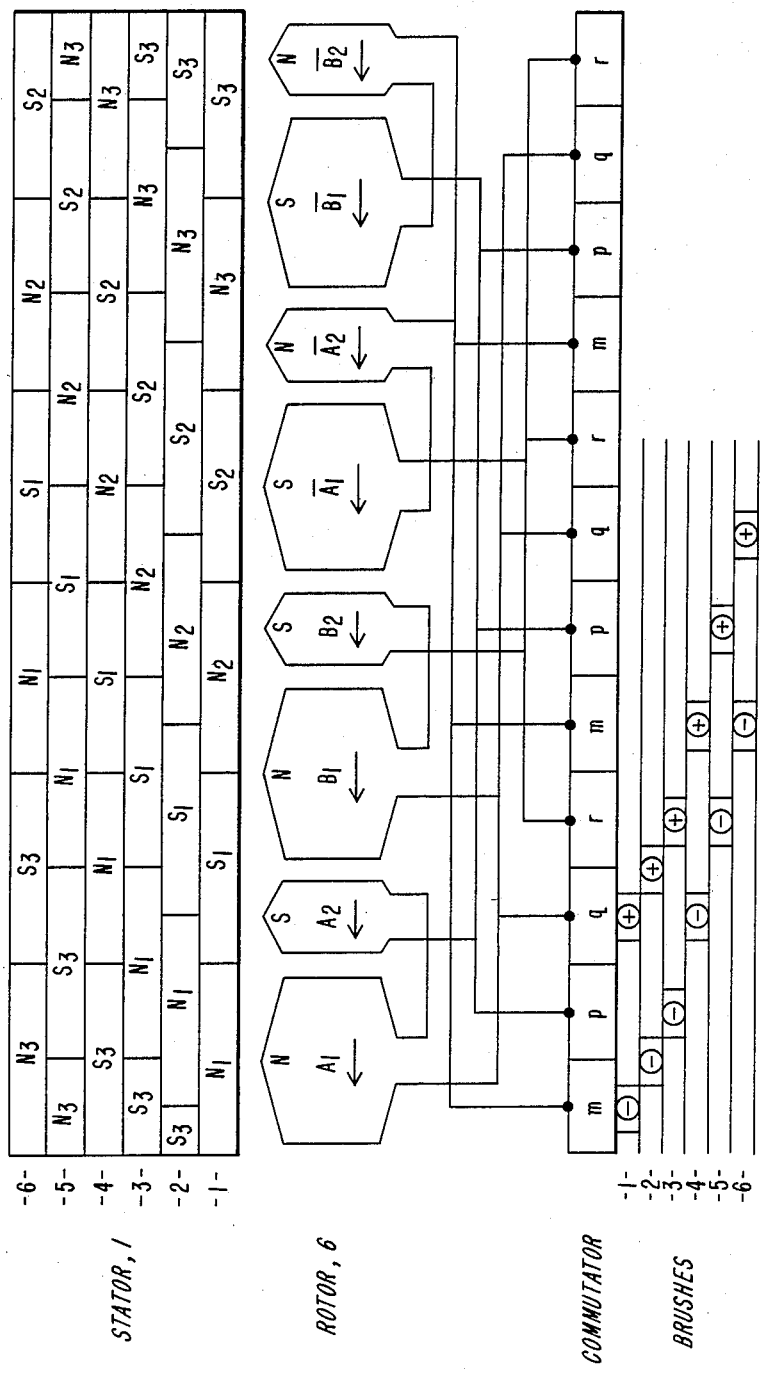
FIG. 61 is a schematic chart showing the stator magnet arrangement, the rotor armature windings and the commutator segment relations for various rotor positions of a "two-phase" direct-current commutator motor constructed in accordance with the principles of the invention.
Figure 61B:
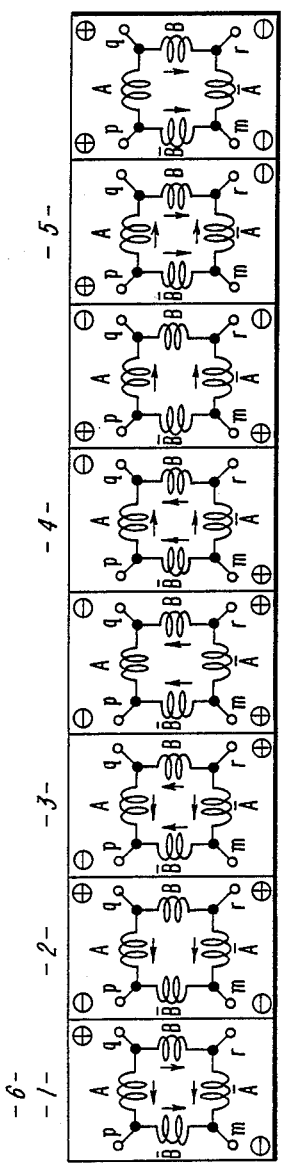
Figure 61C:
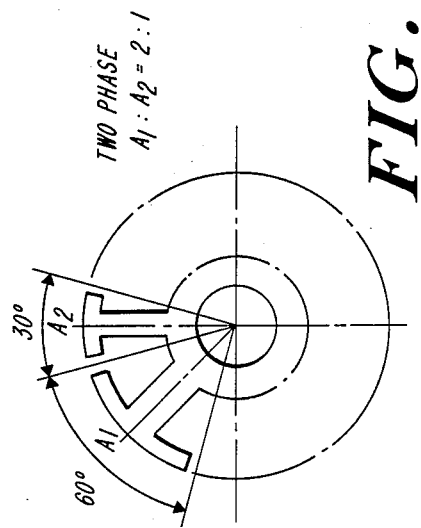

FIG. 61 shows a schematic diagram of a direct-current commutator motor which has been arranged for "two-phase" operation. The motor is arranged with permanent magnet stator poles and a wound rotor in a similar manner to the motor of FIGS. 49–60. The number of stator poles, P, has been chosen to be six and the phase multiplier, k, has been chosen as two to reduce radial forces. From equation (2) the number of rotor armatures is equal to eight. In accordance with equation (3) there are two rotor armatures per mechanical phase with angles of 30° and 60° (equations (6) and (7)). As with FIGS. 49–60, the windings on each of the rotor armatures are illustrated by hexagonal figures in FIG. 61(A) with the width of the figures schematically illustrating the width of the armatures.

FIG. 61 is similar to FIGS. 49–60 with the exception that six different positions of the rotor have been shown schematically in the same figure. Although rotor 6 moves to the left, this movement has been schematically illustrated by showing shifted positions of the stator poles and the brushes. In reality the stator and brushes would remain stationary and the rotor would move to the left. The six rotor positions are labeled 1, 2, 3, 4, 5 and 6.

The rotor windings are connected as shown in FIG. 61, and, as previously described, to minimize radial forces, the windings are connected so that the current flowing in radially opposing phases generates compensating forces. This current flow is shown in the phase diagrams of FIG. 61(B) which also shows three intermediate current flow states between positions 3 and 4; 4 and 5 and 5 and 6 (these intermediate states represent rotor positions at which the brushes span two adjacent commutator bars).

In the illustrative embodiment of FIG. 61, there are twelve commutator bars which are arranged in groups of four labeled m, p, q, and r. The twelve commutator bars are connected to the rotor windings in the manner shown and the motion of the rotor to the left generates the current flows shown in FIGS 61(B1)–61(B6). A comparison of FIG. 61 with FIGS. 49–60 shows that, at all positions of the rotor 6, a leftward torque is produced and, thus, the rotor cannot lock up with respect to the stator.

Although only a few embodiments have been disclosed in the foregoing description, other modifications and changes which will immediately become obvious to those skilled in the art. For example, the principles of the invention are equally applicable to motors in which the rotor revolves around the periphery of the stator or in which the stator is deposed about the periphery of the rotor. These changes and modifications are considered within the spirit and scope of the invention as set forth in the following claims.

What is claimed is:

1. A three-phase alternating-current rotating electric motor comprising, a rotor having eight permanent magnetic poles disposed about the periphery thereof, said rotor magnetic poles alternating in polarity, and a stator having nine pole pieces, each of said pole pieces being wound with a single winding for forming nine armatures which generate nine magnetic poles on the periphery of said stator, said nine armatures being divided into three armature groups, each armature group consisting of a first, a second and a third armature located physically-adjacent and with the winding of said first armature being connected in series with the winding of said second armature and the winding of said second armature being connected in series with the winding of said third armature and the direction of the windings on said first, said second and said third armatures being arranged so that said first, second and third armatures generate three physically-adjacent magnetic poles which alternate in magnetic polarity.

2. A three-phase alternating-current rotating electric motor comprising, a stator having eight permanent magnetic poles disposed about the periphery thereof, said stator magnetic poles alternating in polarity, and a rotor having nine pole pieces, each of said pole pieces being wound with a single winding for forming nine armatures which generate nine magnetic poles on the periphery of said rotor, said nine armatures being divided into three armature groups, each armature group consisting of a first, a second and a third armature located physically adjacent and with the winding of said first armature being connected in series with the winding of said second armature and the winding of said second armature being connected in series with the winding of said third armature and the direction of the windings on said first, said second and said third armatures being arranged so that said first, second and third armatures generate three physically adjacent magnetic poles which alternate in magnetic polarity.

3. A three-phase alternating-current rotating electric motor comprising, a rotor having ten permanent magnetic poles disposed about the periphery thereof, said rotor magnetic poles alternating in polarity, and a stator having nine pole pieces, each of said pole pieces being wound with a single winding for forming nine armatures which generate nine magnetic poles on the periphery of said stator, said nine armatures being divided into three armature groups, each armature group consisting of a first, a second and a third armature located physically adjacent and with the winding of said first armature being connected in series with the winding of said second armature and the winding of said second armature being connected in series with the winding of said third armature and the direction of the windings on said first, said second and said third armatures being arranged so that said first, second and third armatures generate three physically adjacent magnetic poles which alternate in magnetic polarity.

4. A three-phase alternating-current rotating electric motor comprising, a stator having ten magnetic poles disposed about the periphery thereof, said stator magnetic poles alternating in polarity, and a rotor having nine pole pieces, each of said pole pieces being wound with a single winding for formng nine armatures which generate nine magnetic poles on the periphery of said rotor, said nine armatures being divided into three armature groups, each armature group consisting of a first, a second and a third armature located physically adjacent and with the winding of said first armture being connected in series with the winding of said second armature and the winding of said second armature being connected in series with the winding of said third armature and the direction of the windings on said first, said second and said third armatures being arranged so that said first, second and third armatures generate three physically adjacent magnetic poles which alternate in magnetic polarity.

5. A rotating electric motor for operation with alternating current of M phases, said motor comprising:

a stator having kM pole pieces where k is a natural number, said kM pole pieces, each of said pole pieces being wound with a single winding to generate kM magnetic poles on the periphery of said stator, wherein said kM pole pieces are divided into M armature groups, each armature group consisting of k armatures located physically adjacent and being driven by a single one of said M phases and with the windings of said k armatures being arranged so that the magnetic poles generated by the armatures within each armature group alternate in magnetic polarity;

a rotor having $kM \pm kn1$ wherein n is a pole parameter substantially contiguous permanent magnetic poles disposed about the periphery thereof, said rotor magnetic poles alternating in polarity.

6. An electric motor in accordance with claim 5 wherein $M=3$ and $k=3$.

7. A rotating electric motor for operation with alternating current of M phases, said motor comprising:

a rotor having kM pole pieces therein where k is a natural number, said kM pole pieces, each of said pole pieces being wound with a single winding to generate kM magnetic poles on the periphery of said rotor, wherein said kM pole pieces are divided into M armature groups, each armature group consisting of k armatures located physically adjacent and being driven by a single one of said M phases and with the windings of said k armatures being arranged so that the magnetic poles generated by the armatures within each armature group alternate in magnetic polarity;

a stator having $kM \pm kn$ wherein n is a pole parameter substantially contiguous permanent magnetic poles disposed about the periphery thereof; said stator magnetic poles alternating in polarity.

8. An electric motor in accordance with claim 7 wherein $M=3$ and $k=3$.

* * * * *